(12) United States Patent
Kendapadi et al.

(10) Patent No.: US 11,922,115 B1
(45) Date of Patent: Mar. 5, 2024

(54) SYSTEMS AND METHODS FOR AUTOMATIC GENERATION OF EVENT MATERIALS

(71) Applicant: Wells Fargo Bank, N.A., San Francisco, CA (US)

(72) Inventors: Ananth Kendapadi, Charlotte, NC (US); Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/178,980

(22) Filed: Mar. 6, 2023

(51) Int. Cl.
*G06F 15/16* (2006.01)
*G06F 16/2457* (2019.01)
*G06F 40/109* (2020.01)
*G06F 40/166* (2020.01)

(52) U.S. Cl.
CPC ...... *G06F 40/166* (2020.01); *G06F 16/24578* (2019.01); *G06F 40/109* (2020.01)

(58) Field of Classification Search
CPC . G06F 16/24578; G06F 40/109; G06F 40/166
USPC ........................................................ 709/246
See application file for complete search history.

(56) References Cited

U.S. PATENT DOCUMENTS

| | | | |
|---|---|---|---|
| 8,499,046 B2 * | 7/2013 | Zheng ................... | G06Q 10/107 382/219 |
| 8,988,468 B2 * | 3/2015 | Cheung ................... | G06T 11/60 345/581 |
| 9,159,087 B2 * | 10/2015 | Cheung ............... | G06F 16/9562 |
| 9,836,866 B2 * | 12/2017 | Cheung ..................... | G09G 5/14 |
| 9,977,771 B2 * | 5/2018 | Cogan ................... | G06F 3/1288 |
| 10,360,712 B2 * | 7/2019 | Cheung ................... | G06T 11/60 |
| 10,599,291 B2 * | 3/2020 | Cheung ................... | G09G 5/391 |
| 10,650,245 B2 | 5/2020 | Swaminathan et al. | |
| 10,846,804 B2 * | 11/2020 | Lee ..................... | G06Q 10/1095 |
| 10,887,640 B2 | 1/2021 | Swaminathan et al. | |
| 10,942,628 B2 * | 3/2021 | Cheung ..................... | G06T 3/40 |
| 11,049,161 B2 * | 6/2021 | Simpson ............... | G06F 40/103 |
| 11,107,090 B2 | 8/2021 | Ramamurthy et al. | |
| 11,281,849 B2 * | 3/2022 | Cogan ................... | G06F 3/1208 |
| 11,301,116 B2 * | 4/2022 | Cheung ................... | G06Q 30/02 |
| 2007/0214415 A1 * | 9/2007 | Williams ............ | G06F 3/04817 715/700 |
| 2012/0095819 A1 * | 4/2012 | Li ........................... | G06Q 30/02 705/14.23 |
| 2012/0130825 A1 * | 5/2012 | Evans ................ | G06Q 30/0269 705/14.69 |
| 2012/0284105 A1 * | 11/2012 | Li ........................... | G06Q 30/02 705/14.23 |
| 2013/0022284 A1 * | 1/2013 | Zheng ..................... | G06Q 10/06 382/229 |
| 2014/0281940 A1 * | 9/2014 | Cogan ................... | G06F 3/1256 715/256 |

(Continued)

*Primary Examiner* — Moustafa M Meky
(74) *Attorney, Agent, or Firm* — K&L Gates LLP

(57) ABSTRACT

Systems, apparatuses, methods, and computer program products are disclosed for generating one or more candidate event material sets. An example method includes receiving an event material generation request. The example method further includes generating one or more candidate event feature sets and one or more candidate event material sets based on the one or more candidate event feature sets. The method further includes providing the one or more candidate event material sets.

20 Claims, 14 Drawing Sheets

(56) References Cited

U.S. PATENT DOCUMENTS

2019/0026786 A1 1/2019 Khoury et al.
2020/0218408 A1* 7/2020 Cheung .................. G09G 5/006

* cited by examiner

SYSTEMS AND METHODS FOR AUTOMATIC GENERATION OF EVENT MATERIALS

BACKGROUND

Entities such as individuals, businesses, companies, etc. often generate event materials to announce various events and/or services. However, these event materials may be costly in terms of labor, resources, and/or financially and therefore, said event materials may be prohibitively expensive for entities.

BRIEF SUMMARY

The creation and deployment of event materials (e.g., pamphlets, brochures, flyers, etc.) often requires collaboration between multiple parties (e.g., artists, designers, advertisers, business teams, etc.) and as such, the creation of event materials and corresponding features (e.g., logos, slogans, descriptions, etc.) may be labor, resource, and/or time intensive. Conventional methods used to generate event materials are primarily manual, such that when additional options are desired (e.g., changes to the logo, slogan, description), substantial time and effort may be required to propagate those changes through all materials. This can also result in a high associated cost for said materials. Furthermore, conventional methods do not allow for the simultaneous generation of event materials which incorporate different features/content and additionally depict the features in a variety of styles or designs.

In contrast to these conventional techniques for event material generation, example embodiments described herein allow for the automatic generation of one or more candidate event material sets that include candidate event materials for provision to an end user. In particular, embodiments described herein may allow a user to provide an event material generation request indicative of the event material types he/she would like (e.g., as indicated by a requested event material type set) and the characteristics he/she would like the event materials to possess (e.g., as indicated by the requested characteristics set) to a candidate event material generation system. The candidate event material generation system may process the requested characteristics set to generate candidate event feature sets which include candidate event features which embody the desired characteristics. This may be done by leveraging machine learning and in particular, may be accomplished by using a trained event feature generation model to generate candidate event features in a manner that is sentiment-aware and/or context-aware. In particular, the trained event feature generation model may be a trained generative neural network configured to receive the characteristics described by the requested characteristics set and generate candidate event features which incorporate the given sentiments of characteristics as specified by a user. As such, this may alleviate an artistic burden on entities to create features which are relevant to given keywords, target demographics, and/or design styles.

Furthermore, in some embodiments, generated candidate event features may be further processed to determine a relevancy score based on a similarity between the candidate event feature and the characteristics described by the requested characteristics set. Only suitable event features may be appended to a candidate event feature set such that only candidate event materials that include relevant candidate event features are generated, thus conserving computational resources.

Additionally, embodiments described herein may allow for the simultaneous generation of candidate event materials that vary in content as well as style. In particular, embodiments described herein may ensure the generated candidate event materials use different candidate event features to vary the content between the candidate event materials and additionally, may use different attribute sets to vary the design and/or style between the candidate event materials. As such, each generated candidate event material may use different relevant features which may be depicted in a variety of ways such that an end user may be presented with a variety of combinations without manually needing to specify such.

In some embodiments, a candidate event material generation system may further increase speed and operational reliability of an electronic data management system that is configured to generate the candidate event materials by performing parallel processing operations. For example, the operations of generating candidate event features for each candidate feature set, generating attributes for each attribute set, and/or generating candidate event materials for each candidate event material set may be performed simultaneously. As such, the candidate event materials for requested candidate event material types may be provided to a user in a more computationally and resource efficient manner.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
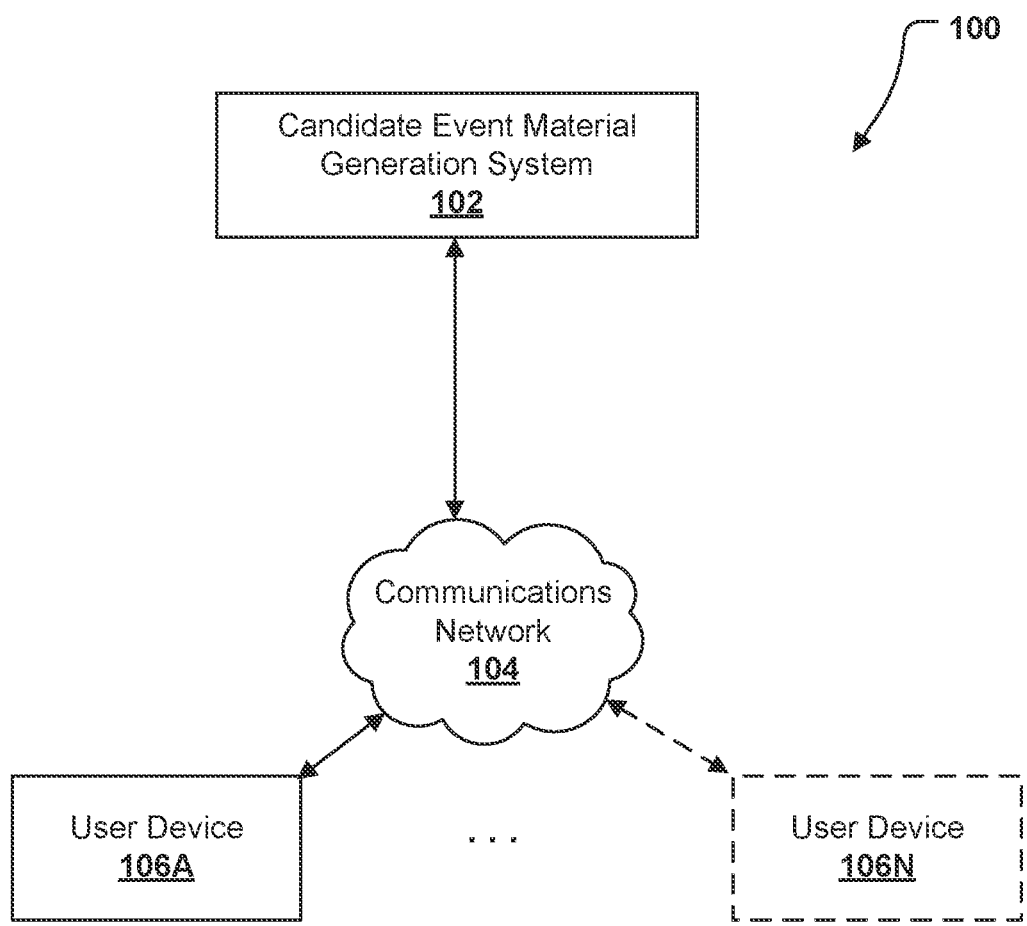
FIG. 1 illustrates a system for generating a candidate event material set in which some example embodiments may be used.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "event material generation request" may refer to a data packet that is configured to describe a requested characteristics set and a requested event material type set. The event material generation request may be generated by a user device and provided to the candidate event material generation system for subsequent processing. In some embodiments, the event material generation request further includes one or more predetermined event feature sets, and each predetermined event feature set may be associated with an event feature type. The one or more predetermined event feature sets and corresponding predetermined event features included in the corresponding sets may be selected and input by the user. In some embodiments, the event material generation request is generated in response to user interaction, directly or indirectly, with the user device. In an instance the candidate event material generation system receives the event material generation request, the candidate event material generation system may use one or more system devices to process the event material generation request and subsequent operations. The event material generation request may further include one or more specifications such as a requested number of candidate event features, a requested number of candidate event materials, a requested number of attributes, and/or the like, which may influence the number of candidate event materials generated.

The term "requested characteristics set" may refer to a data element configured to describe a collection of characteristics requested for a given requested event material type set. The characteristics included in the requested characteristics set may be input and/or selected by the user and included in the event material generation request. The characteristics may be text or graphical elements configured to describe a target audience, theme, motif, design and/or the like for requested event materials. The characteristics may describe design elements (e.g., colors, font, text style, etc.), target demographics, keywords, and/or the like.

The term "requested event material type set" may refer to a data element configured to describe a collection of event material types requested by a user. The event material types included in the requested event material type set may be input and/or selected by the user and included in the event material generation request. The event material types may describe event material types which a user requests to receive. Event material types may include a particular type of formatted data structure. In some embodiments, event material types may include a brochure event material type, pamphlet event material type, flyer event material type, billboard event material type, business card event material type, email event material type, giveaway box event material type, mailing campaign event material type, newspaper event material type, social media production event material type, sign event material type, window display event material type, graphical event material type, website event material type, and/or the like. Each event material type may be associated with particular specifications (e.g., event material dimensions, format, layout, etc.). Additionally, each event material type may be associated with one or more event feature types. In particular, an event material type may be associated with an event feature type which are incorporated in the particular event material corresponding to an event material type.

The term "candidate event feature set" may refer to a data element configured to describe a collection of candidate event features generated in response to receipt of an event material generation request. A candidate event feature set may be associated with an event feature type, which may correspond to a type of event features included within the candidate event feature set. An event feature type may include a slogan event feature type, a logo event feature type, an image event feature type, a description event feature type, title event feature type, a branding event feature type, a comparative table event feature type, and/or the like. Each candidate event feature included in the candidate event feature set may be associated with the same event feature type and thus, may be structured and/or formatted similarly. Candidate event feature sets may be generated in an instance the corresponding event feature type is required and/or included by an event material type described in the requested event material type set. Candidate event features may be generated by an event feature generation model. In some embodiments, the number of candidate event features included in a candidate event feature set may be a predetermined number and may be based on the event material generation request. In particular, the number of candidate event features included in a candidate event feature set may be based on a requested number of candidate event features described in the event material generation request. Candidate event features may also be subsequently used by other models, such as the evaluation model and/or event material generation model. A candidate event feature may correspond to a candidate data element that may be used in one or more generated candidate event materials.

In some embodiments, a candidate event feature set may be generated based on a predetermined event feature set. A predetermined event feature set which includes one or more predetermined event features may be included in the event material generation request and may further correspond to an event feature type. In such an instance, a candidate event feature set corresponding to the same event feature type may be generated such that it includes the one or more predetermined event features. In some embodiments, only the candidate event feature set may only include the predetermined event features described by the predetermined event feature set which corresponds to the same event feature type. Alternatively, the candidate event feature set may include the predetermined event features described by the predetermined event feature set corresponding to the same event feature type as well as one or more generated candidate event features.

In some embodiments, a candidate event feature set may include only chosen, filtered, or otherwise selected candidate event features. In some embodiments, candidate event features may be associated with a relevancy score as determined by an evaluation model. As such, only candidate event features which are associated with a relevancy score that satisfies one or more relevancy score threshold may be appended or otherwise included in the candidate event feature set corresponding to the same event feature type. In some embodiments, only a certain number of candidate event features may be included or appended to the candidate event feature set. As such, candidate event features of the same event feature type may be ordered based on the relevancy scores and the top candidate event features may be appended to the candidate event feature set.

In some embodiments, user input may be used to determine the one or more candidate event features included in the candidate event feature set. A user feedback request may be generated such that it includes one or more candidate event feature sets and the corresponding candidate event features and provided to a user such that the user is able to select one or more candidate event features he/she would like to use as candidate event features. A user feedback response may be received once a user has provided this feedback and may indicate the user selections of candidate event features from each of the one or more candidate event features included in the user feedback request. As such, candidate event features which were not selected by the user as indicated by the user feedback response may be removed from the corresponding candidate event feature set.

The term "candidate event material set" may refer to a data element configured to describe a collection of candidate event materials generated in response to receipt of an event material generation request. A candidate event material set may be associated with an event material type, which may correspond to an event material type included within the requested event material type set. In some embodiments, event material types may include a brochure event material type, pamphlet event material type, flyer event material type, billboard event material type, business card event material type, email event material type, giveaway box event material type, mailing campaign event material type, newspaper event material type, social media production event material type, sign event material type, window display event material type, graphical event material type, website event material type, and/or the like. In some embodiments, the number of candidate event materials generated may be a predetermined number and may be based on the event material generation request. In particular, the number of candidate event materials generated may be based on a requested number of candidate event materials described in the event material generation request.

Candidate event materials may be generated by an event material generation model. In particular, a candidate event material may be generated based on candidate event features selected from each candidate event feature set associated with event feature types for the corresponding event material type. In particular, a selected feature set may be generated by selecting a candidate event feature from each identified candidate event feature set and then the event material may be generated based on the candidate event features included in the selected feature set.

Each selected feature set may additionally be associated with an attribute set that includes one or more attributes. An attribute set may be generated based on the associated requested characteristic set or may be determined based on default attributes. An attribute in a given attribute set may describe a particular format, specification, shape, size, style, and/or the like for the one or more selected candidate event features. In some embodiments, an attribute may describe a font selection, text size, color, relative position, or absolute position for selected candidate event features. As such, the selected features included in the selected feature set for the candidate event material may be incorporated into the candidate event material based on the attributes in the attribute set.

Each candidate event material in a candidate event material set for a given event material type may differ from another candidate event material with respect to at least one element. In some embodiments, candidate event materials may have different candidate event features for a given event feature type. In some embodiments, candidate event materials may have different attributes for a given candidate event feature. As such, each candidate event material included in the candidate event material set is unique with respect to content (e.g., due to the use of different candidate event features) and/or stylistic design (e.g., due to the use of different attributes for a candidate event feature).

The term "event feature generation model" may refer to a data element that is configured to describe parameters, hyper-parameters, and/or stored operations of a model configured to process the requested characteristics set and the requested event material type set to generate one or more candidate event features sets. In some embodiments, the event feature generation model is a machine learning model and in particular, may be a trained generative neural network model (e.g., a generative adversarial network (GAN), variational autoencoder (VAE), autoregressive model, etc.). The event feature generation model may be trained using labeled event feature training data, which may describe example text and/or images which are associated with one or more labels (e.g., keywords, target demographics, sentiments, design elements, etc.), in order to teach the event feature generation model to generate candidate event feature sets which express the characteristics and/or attributes which align with the characteristics and/or attributes described by the requested characteristics set.

Although the event feature generation model is described as a single model, in some embodiments the event feature generation model may include multiple generative neural network models, which may each be trained for a particular event feature type. Alternatively, the event feature generation model may be a single generative neural network model configured to handle multiple event feature types. Additionally, in some embodiments the event feature generation model may be configured to take multiple characteristics as input at once, which may allow the model to converge faster. The event feature generation model may be used to generate a set number of candidate event features for each candidate event feature set. The generated candidate event features may be appended to a candidate event feature set corresponding to an associated event feature type or may be processed further (e.g., by an evaluation model).

The term "event material generation model" may refer to a data element that is configured to describe parameters, hyper-parameters, and/or stored operations of a model configured to process the one or more candidate event feature sets and the requested event material type set to generate one or more candidate event feature sets. In some embodiments, the event material generation model is a machine learning model and in particular, may be a trained neural network. In some embodiments, the event material generation model may be a rules-based model configured to operate according to a stored set of rules and/or operations. The event material generation model may be configured to generate a set number of candidate event materials for each event material type. In particular, the event material generation model may be configured to identify one or more candidate event feature sets which correspond to event feature types associated with an event material type described by the requested event material type set. The event material generation model may then be configured to generate a selected feature set by selecting a candidate event feature from each of the identified candidate event feature sets. The event material generation model may then generate a candidate event material based on the selected feature set and in accordance with particular specifications (e.g., event material dimensions, format, layout, etc.) associated with the event material type. The event material generation model may generate multiple selected feature sets such that multiple candidate event materials are generated for a particular event material type. The event material generation model may be configured to generate each selected feature set such that it is unique with respect to at least one candidate event feature of the other selected feature sets.

In some embodiments, the event material generation model may further be configured to generate one or more attribute sets. In some embodiments, the event material generation model may use natural language processing (NLP) techniques and/or sentiment analysis techniques such that it is configured to process the requested characteristics set and determine one or more attributes based on the requested characteristics. In some embodiments, the event material generation model may be a classification neural network that may be trained to determine one or more attribute categories based on the requested characteristics set. Each attribute category may be associated with various identifiable sentiments, keywords, target audiences or demographics, and/or the like. As such, the event material generation model may process the requested characteristics set to identify sentiments, keywords, target audiences or demographics, etc. and determine or more attribute categories to use when generating the candidate event material set. Each attribute category may be associated with one or more attributes, which the event material generation model may identify and append to an attribute set for a given selected feature set. In some embodiments, an attribute category may include multiple attribute options for a same attribute type such that all options are included in the attribute set. The event material generation model may also be configured to generate a candidate event material based on an attribute set. The event material generation model may generate multiple attribute sets such that multiple candidate event materials are generated for a particular selected feature set. The event material generation model may be configured to generate each attribute such that it is unique with respect to at least one attribute of the other attribute sets.

The term "evaluation model" may refer to a data construct that is configured to describe parameters, hyper-parameters, and/or stored operations of a model configured to process candidate event features to determine a relevancy score for each input candidate event feature. In some embodiments, the evaluation model may be a trained machine learning model, such as a neural network, that may use sentiment analysis techniques and/or NLP, to determine a relevancy score for a given candidate event feature. The evaluation model may process the requested characteristics set to identify sentiments, keywords, target audiences or demographics, etc. and similarly, process one or more candidate event features to identify sentiments, keywords, target audiences or demographics, etc. indicated by the candidate event feature. The evaluation model may then compare the identified sentiments, keywords, target audiences or demographics for the requested characteristics set and candidate event features to derive a relevancy score, which may be indicative of how well a candidate event feature matches requested characteristics and/or an inferred similarity between the candidate event feature and the requested characteristics. The evaluation model may then output the relevancy scores for the candidate event features, which may subsequently be used by other models, such as the event feature generation model.

System Architecture

Example embodiments described herein may be implemented using any of a variety of computing devices or servers. To this end, FIG. 1 illustrates an example environment 100 within which various embodiments may operate. As illustrated, a candidate event material generation system 102 may receive and/or transmit information via communications network 104 (e.g., the Internet) with any number of other devices, such as one or more of user devices 106A-106N.

The candidate event material generation system 102 may be implemented as one or more computing devices or servers, which may be composed of a series of components. Particular components of the candidate event material generation system 102 are described in greater detail below with reference to apparatus 200 in connection with FIG. 2A.

The one or more user devices 106A-106N may be embodied by any computing devices known in the art. The one or more user devices 106A-106N need not themselves be independent devices but may be peripheral devices communicatively coupled to other computing devices.

Although FIG. 1 illustrates an environment and implementation in which the candidate event material generation system 102 interacts indirectly with a user via one or more of user devices 106A-106N, in some embodiments users may directly interact with the candidate event material generation system 102 (e.g., via communications hardware of the candidate event material generation system 102). Whether by way of direct interaction or indirect interaction via another device, a user may communicate with, operate, control, modify, or otherwise interact with the candidate event material generation system 102 to perform the various functions and achieve the various benefits described herein.

Example Implementing Apparatuses

Figure 2A:
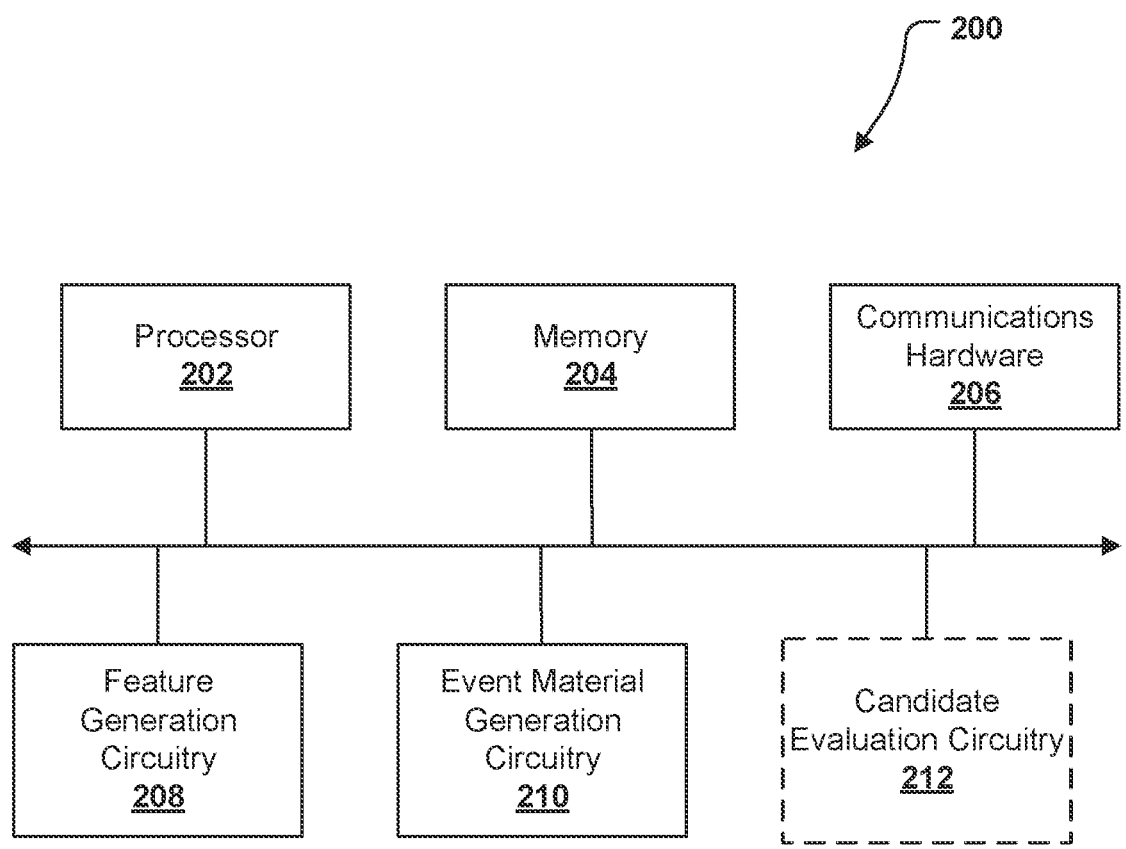
FIG. 2A illustrates a schematic block diagram of example circuitry embodying a system device that may perform various operations in accordance with some example embodiments described herein.

The candidate event material generation system 102 (described previously with reference to FIG. 1) may be embodied by one or more computing devices or servers, shown as apparatus 200 in FIG. 2A. The apparatus 200 may be configured to execute various operations described above in connection with FIG. 1 and below in connection with FIGS. 3-10. As illustrated in FIG. 2A, the apparatus 200 may include processor 202, memory 204, communications hardware 206, feature generation circuitry 208, event material generation circuitry 210, and candidate evaluation circuitry 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network. In particular, the communications hardware 206 may be configured to receive an event material generation request and provide one or more candidate event material sets. In some embodiments, the communications hardware 206 may be configured to provide a user feedback request and/or receive a user feedback response.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises feature generation circuitry 208 that may be configured to generate one or more candidate event feature sets and the one or more candidate event features included in the one or more candidate event feature sets. In some embodiments, the feature generation circuitry 208 may be configured to access and use an event feature generation model, which may be stored in memory 204 or another storage device. Feature generation circuitry 208 may also be configured to select candidate event features to append to a particular candidate event feature set based on relevancy scores each associated with corresponding candidate event features. The feature generation circuitry 208 may utilize processor 202, memory 204, or any other hardware component included in the apparatus 200 to perform these operations, as described in connection with FIGS. 3-10 below. The feature generation circuitry 208 may further utilize communications hardware 206 to gather data from a variety of sources (e.g., user device 106A through user device 106N as shown in FIG. 1 or another storage device (not shown)), and/or exchange data with a user, and in some embodiments may utilize processor 202 and/or memory 204 to perform the above described operations.

In addition, the apparatus 200 further comprises event material generation circuitry 210 that may be configured to generate one or more candidate event material sets. In some embodiments, the event material generation circuitry 210 may be configured to access and use an event material generation model, which may be stored in memory 204 or another storage device. The event material generation circuitry 210 may be configured to identify the one or more candidate event feature sets which correspond to one or more feature types associated with an event material type for a given candidate event material set. The event material generation circuitry 210 may then generate a selected feature set by selecting candidate event features from each identified candidate event feature set and generating a candidate event material based on the selected feature set. Event material generation circuitry 210 may further be configured to determine attribute sets for a selected feature set based on a requested characteristics set and may additionally generate a candidate event material based on an attribute set. The event material generation circuitry 210 may utilize processor 202, memory 204, or any other hardware component included in the apparatus 200 to perform these operations, as described in connection with FIGS. 3-10 below. The event material generation circuitry 210 may further utilize communications hardware 206 to gather data from a variety of sources (e.g., user device 106A through user device 106N as shown in FIG. 1 or another storage device (not shown)), and/or exchange data with a user, and in some embodiments may utilize processor 202 and/or memory 204 to perform the above described operations.

Further, in some embodiments, the apparatus 200 further comprises a candidate evaluation circuitry 212 that is configured to determine a relevancy score for each candidate event feature in a candidate event feature set. In some embodiments, the candidate evaluation circuitry 212 may be configured to access and use an evaluation model, which may be stored in memory 204 or another storage device. The candidate evaluation circuitry 212 may utilize processor 202, memory 204, or any other hardware component included in the apparatus 200 to perform these operations, as described in connection with FIGS. 3-10 below. The candidate evaluation circuitry 212 may further utilize communications hardware 206 to gather data from a variety of sources (e.g., user device 106A through user device 106N as shown in FIG. 1 or another storage device (not shown)), and/or exchange data with a user, and in some embodiments may utilize processor 202 and/or memory 204 to perform the above-described operations.

Although components 202-212 are described in part using functional language, it will be understood that the particular implementations necessarily include the use of particular hardware. It should also be understood that certain of these components 202-212 may include similar or common hardware. For example, the feature generation circuitry 208, event material generation circuitry 210, and candidate evaluation circuitry 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the feature generation circuitry 208, event material generation circuitry 210, and candidate evaluation circuitry 212 may leverage processor 202, memory 204, or communications hardware 206 as described above, it will be understood that any of feature generation circuitry 208, event material generation circuitry 210, and candidate evaluation circuitry 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that feature generation circuitry 208, event material generation circuitry 210, and candidate evaluation circuitry 212 comprise particular machinery designed for performing the functions described herein in connection with such elements of apparatus 200.

Figure 2B:
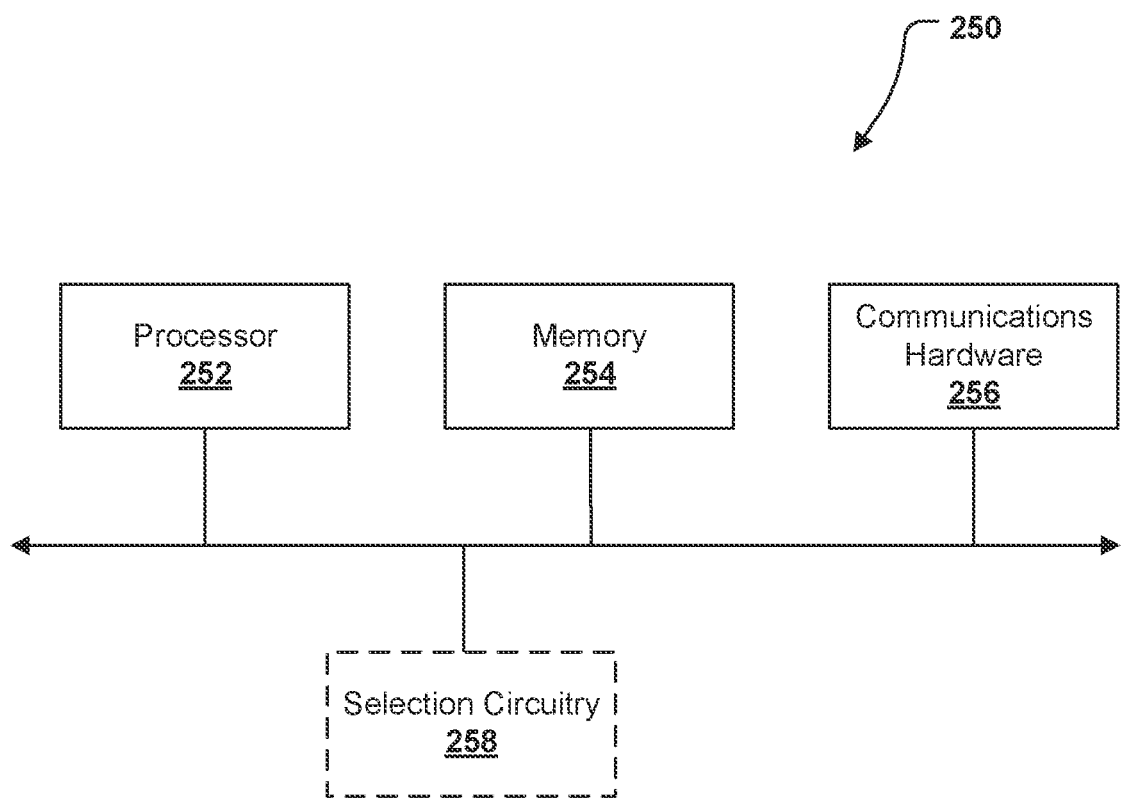
FIG. 2B illustrates a schematic block diagram of example circuitry embodying a user device that may perform various operations in accordance with some example embodiments described herein.

As illustrated in FIG. 2B, an apparatus 250 is shown that represents an example user device (e.g., any of user device 106A through user device 106N). The apparatus 250 includes processor 252, memory 254, and communications hardware 256, each of which is configured to be similar to the similarly named components described above in connection with FIG. 2A. However, the apparatus 250 may also include selection circuitry 258, which includes hardware components which may be configured to allow a user to select one or more candidate event features from a user feedback request and additionally, may be configured to generate and provide a user feedback response based on the user selections. The selection circuitry 258 may utilize processor 252, memory 254, communications hardware 256 or any other hardware component included in the apparatus 250 to perform these operations, as described in connection with FIG. 10 below.

In some embodiments, various components of the apparatuses 200 and 250 may be hosted remotely (e.g., by one or more cloud servers) and thus need not physically reside on the corresponding apparatus 200 or 250. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200 or 250. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2A or apparatus 250 as described in FIG. 2B, that loading the software instructions onto a computing device or apparatus produces a special-purpose machine comprising the means for implementing various functions described herein.

Having described specific components of example apparatuses 200 and 250, example embodiments are described below in connection with a series of graphical user interfaces and flowcharts.

Example Operations

FIGS. 3-9 illustrate example flowcharts that contains example operations implemented by example embodiments described herein. The operations illustrated in FIGS. 3-9 may, for example, be performed by system device of the candidate event material generation system 102 shown in FIG. 1, which may in turn be embodied by an apparatus 200, which is shown and described in connection with FIG. 2A. To perform the operations described below, the apparatus 200 may utilize one or more of processor 202, memory 204, communications hardware 206, feature generation circuitry 208, event material generation circuitry 210, candidate evaluation circuitry 212 and/or any combination thereof. It will be understood that user interaction with the candidate event material generation system 102 may occur directly via communications hardware 206, or may instead be facilitated by a separate device such as any one of user devices 106A-106N, as shown in FIG. 1, and which may have similar or equivalent physical componentry facilitating such user interaction.

Figure 3:
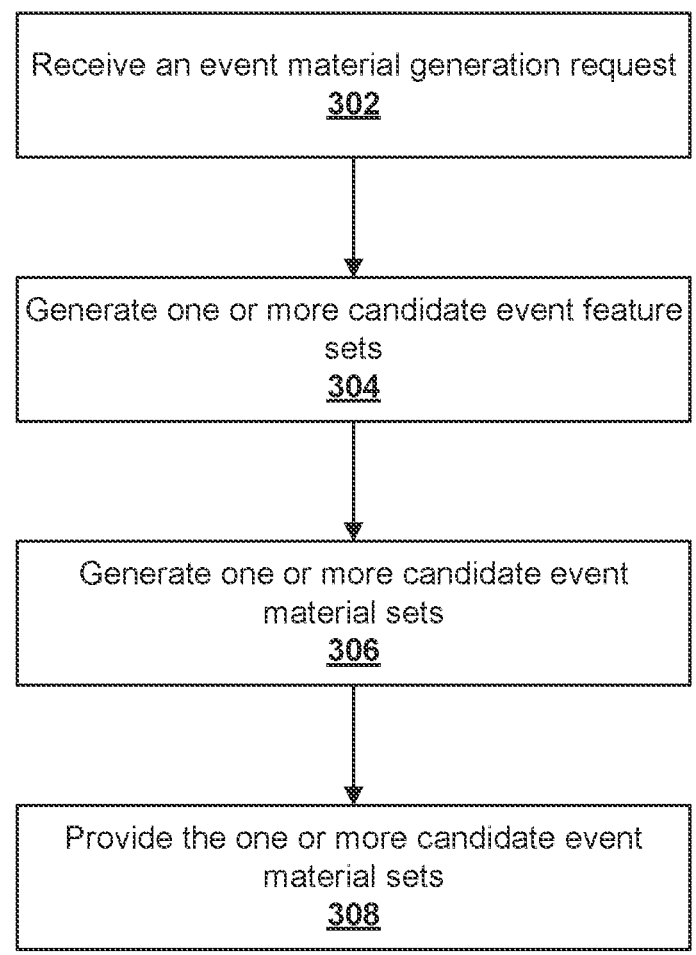
FIG. 3 illustrates an example flowchart for generating one or more candidate event material sets, in accordance with some example embodiments described herein.

Turning first to FIG. 3, example operations are shown for generating one or more candidate event material sets.

As shown by operation 302, the apparatus 200 includes means, such as processor 202, memory 204, communications hardware 206, or the like, for receiving an event material generation request. The event material generation request may be received by apparatus 200 from a user device, such as a user device (e.g., any one of user devices 106A-106N). The event material generation request may describe a requested characteristics set and a requested event material type set. Receipt of the event material generation request may trigger apparatus 200 to perform subsequent operations further described below.

The requested characteristics set may describe a collection of characteristics requested for a given requested event material type set (e.g., as requested by a user). The characteristics may be text or graphical elements configured to describe a target audience, theme, motif, design and/or the like for requested event materials. The characteristics may describe design elements (e.g., colors, font, text style, etc.), target demographics, keywords, and/or the like. For example, characteristics included in the requested characteristics set may include the design elements "bright", "professional", and a graphical image of a beach with clouds, a target demographic of "young adults", and keywords "new card service". As such, the characteristics may indicate the user wants to reach a young adult audience, would like the candidate event materials to relate to a new card service, and prefers a design that is bright and professional and incorporates sentiments similar to a beach.

The requested event material type set may describe a collection of event material types requested by a user and further, may describe event material types which a user requests to receive. Event material types may include a particular type of formatted data structure. In some embodiments, event material types may include a brochure event material type, pamphlet event material type, flyer event material type, billboard event material type, business card event material type, email event material type, giveaway box event material type, mailing campaign event material type, newspaper event material type, social media production event material type, sign event material type, window display event material type, graphical event material type, website event material type, and/or the like. Each event material type may be associated with particular specifications (e.g., event material dimensions, format, layout, etc.). As such, the apparatus 200 may determine to generate candidate event material sets which correspond to the event material types described by the requested event material type set. For example, a requested event material type set may include an email event material type, a flyer event material type, and a brochure event material type. As such, apparatus 200 may determine to generate three candidate event material sets each corresponding to an email event material type, a flyer event material type, and a brochure event material type.

In some embodiments, the event material generation request further includes one or more predetermined event feature sets, and each predetermined event feature set may be associated with an event feature type. The one or more predetermined event feature sets and corresponding predetermined event features included in the corresponding sets may be selected and input by the user. For example, a user may already have chosen or selected a slogan event feature type such that he/she prefers the generated candidate event materials include or otherwise incorporate the predetermined slogan, if required by the event material type. As such, the event material generation request may include a predetermined event feature set corresponding to a slogan event feature type which includes the predetermined event feature "slogan xyz". As such, "slogan xyz" will always be selected for a slogan event feature type. In some embodiments, the user may have multiple options they want to consider for a given event feature type. As such, the predetermined event feature set may include all predetermined event features input by a user. By way of continuing example, a user may also want to consider "slogan 123" as a slogan event feature type. As such, the predetermined event feature set corresponding to a slogan feature type may include the predetermined event features "slogan xyz" and "slogan 123" such that either predetermined event features may be selected when generating candidate event materials.

The event material generation request may further include one or more specifications such as a requested number of candidate event features, a requested number of candidate event materials, a requested number of attributes, and/or the like, which may influence the number of candidate event materials generated. The one or more specifications may inform the apparatus 200 on one or more stopping conditions and advantageously, provide the user with an optimal number of candidate event materials such that they have a desired variety of options but are not overwhelmed by the volume of candidate event materials.

As shown by operation 304, the apparatus 200 includes means, such as processor 202, memory 204, communications hardware 206, feature generation circuitry 208, candidate evaluation circuitry 212, or the like, for generating one or more candidate event feature sets. Each candidate event feature set may describe a collection of candidate event features generated in response to receipt of an event material generation request. In particular, a feature generation circuitry 208 may use an event feature generation model to generate the one or more candidate event feature sets (e.g., as accessed from memory 204 or other storage device configured to store the event feature generation model). A candidate event feature set may be associated with an event feature type, which may correspond to a type of event features included within the candidate event feature set. An event feature type may include a slogan event feature type, a logo event feature type, an image event feature type, a description event feature type, title event feature type, a branding event feature type, a comparative table event feature type, and/or the like. Each candidate event feature included in the candidate event feature set may be associated with the same event feature type and thus, may be structured and/or formatted similarly.

In particular, the feature generation circuitry 208 may identify required candidate event feature sets required to generate the candidate event material types described in the requested event material type set. By way of continuing example, as described above, apparatus 200 may determine to generate three candidate event material sets each corresponding to an email event material type, a flyer event material type, and a brochure event material type. Feature generation circuitry may then determine that (i) an email event material type is associated with a title event feature type, a slogan event feature type, a description event feature type, and an image event feature type; (ii) a flyer event material type is associated with a title event feature type, a slogan event feature type, a description event feature type, and an image event feature type; and (iii) a brochure event material type is associated with a title event feature type, a slogan event feature type, a description event feature type, an image event feature type, and a comparative table event feature type. As such, the feature generation circuitry may determine to generate five candidate event feature sets, which are associated with a title event feature type, a slogan event feature type, a description event feature type, an image event feature type, and a comparative table event feature type.

In some embodiments, the number of candidate event features included in a candidate event feature set may be a predetermined number and may be based on the event material generation request such that a stopping condition may be defined. In particular, the number of candidate event features included in a candidate event feature set may be based on a requested number of candidate event features described in the event material generation request. Alternatively, the number of candidate event features generated may be based on other criteria, such as a requested number of candidate event materials. The feature generation circuitry 208 may use the requested number of candidate event materials as a ceiling value and determine number of candidate event feature for each candidate event feature set for which unique permutations of the candidate event features result in a number of candidate event materials that is equal to or less than the ceiling value.

Figure 4:
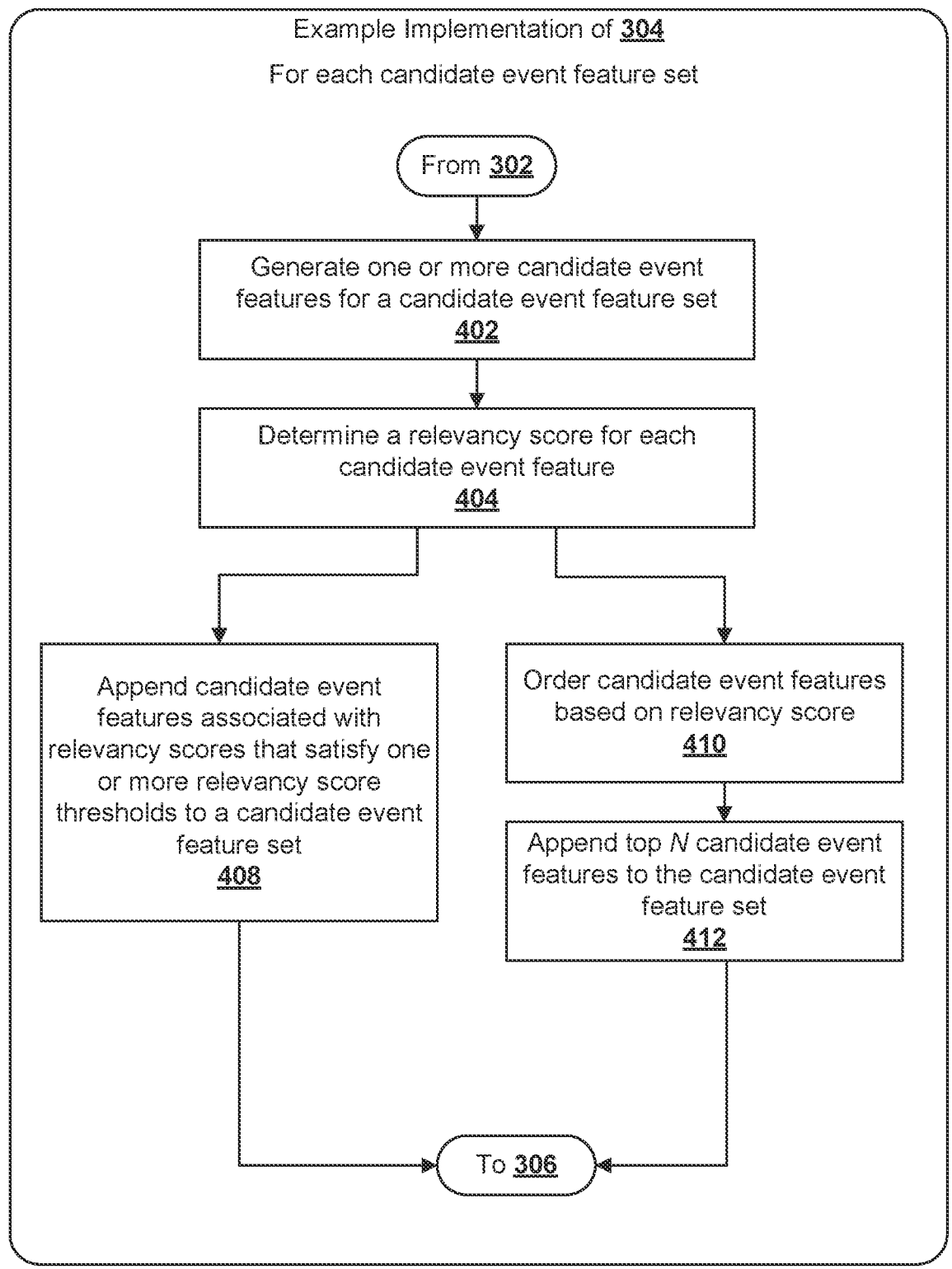
FIG. 4 illustrates an example flowchart for generating a candidate event feature set for a particular event feature type, in accordance with some example embodiments described herein.

In some embodiments, operation 304 may be performed in accordance with the operations described by FIG. 4. Turning now to FIG. 4, example operations are shown for generating a candidate event feature set for a particular event feature type. The operations described in FIG. 4 may be repeated for each candidate event feature set identified or otherwise determined to be required by the feature generation circuitry 208.

As shown by operation 402, the apparatus 200 includes means, such as processor 202, memory 204, communications hardware 206, feature generation circuitry 208, or the like, for generating one or more candidate event features for a candidate event feature set. As described above, the feature generation circuitry 208 may use an event feature generation model to generate one or more candidate event features for a candidate event feature set. An event feature generation model may be configured to process the requested characteristics set and the requested event material type set to generate candidate event features for a given candidate event feature set (e.g., corresponding to a given event feature type). In some embodiments, the event feature generation model is a machine learning model and in particular, may be a trained generative neural network model. In particular, the event feature generation model may be trained to generate candidate event features which are designed and/or incorporate the characteristic of with the requested characteristics set. As such, the event feature generation model may be configured to take the one or more characteristics described by the requested characteristics set as input and then output one or more candidate event features of an event feature type, which are inferred to correspond to the input characteristics.

By way of continuing example, two candidate event features may be generated for an image event feature type based on the requested characteristics set which includes the design elements "bright", "professional", and a graphical image of a beach with clouds, a target demographic of "young adults", and keywords "new card service". A first candidate event feature may depict a payment card with an image of a beach and a second candidate event feature may depict a payment card with an image of a rain cloud. This may be due to an inference of the presence of water and cloud in the graphical image of a beach with clouds.

As shown by operation 404, the apparatus 200 includes means, such as processor 202, memory 204, communications hardware 206, feature generation circuitry 208, candidate evaluation circuitry 212, or the like, for determining a relevancy score for each candidate event feature. In particular, candidate evaluation circuitry 212 may access and use an evaluation model (e.g., as accessed from memory 204 or other storage device configured to store the event feature generation model) to determine a relevancy for each generated candidate event feature. The evaluation model may be configured to process candidate event features to determine a relevancy score for each candidate event feature. In some embodiments, the evaluation model may be a trained machine learning model, such as a neural network, that may use sentiment analysis techniques and/or NLP, to determine a relevancy score for a given candidate event feature. The evaluation model may process the requested characteristics set to identify sentiments, keywords, target audiences or demographics, etc. and similarly, process one or more candidate event features to identify sentiments, keywords, target audiences or demographics, etc. indicated by the candidate event feature. The evaluation model may then compare the identified sentiments, keywords, target audiences or demographics for the requested characteristics set and candidate event features to derive a relevancy score, which may be indicative of how well a candidate event feature matches requested characteristics and/or an inferred similarity between the candidate event feature and the requested characteristics. The evaluation model may then output the relevancy scores for the candidate event features, which may subsequently be used by other models, such as the event feature generation model.

By way of continuing example, the first candidate event feature depicting a payment card with an image of a beach and the second candidate event feature depicting a payment card with an image of a rain cloud may be input to the evaluation model. The evaluation model may then determine a relevancy score of 0.8 for the first candidate event feature depicting a payment card with an image of a beach and a relevancy score of 0.6 for the second candidate event feature depicting a payment card with an image of a rain cloud. This may be because the design element "bright" causes the image of a beach to be more relevant and the image of a rain cloud to be less relevant.

Advantageously, by determining a relevancy score independently from generating the candidate event features, the generated candidate event features may be analyzed for sentiment and desirability such that less relevant candidate event features may be excluded from a given candidate event feature set. This may result in producing more relevant candidate event materials on a first candidate event material generation attempt, thus reducing computational burdens required for subsequent event material generation requests.

In some embodiments, the feature generation circuitry may then proceed to operation 408. As shown by operation 408, the apparatus 200 includes means, such as processor 202, memory 204, communications hardware 206, feature generation circuitry 208, candidate evaluation circuitry 212, or the like, for appending candidate event features associated with relevancy score that satisfy one or more relevancy score thresholds to the candidate event feature set. In some embodiments, the feature generation circuitry 208 may define one or more relevancy score thresholds which may be used to determined whether to add a candidate event feature to the candidate event feature set.

By way of continuing example, a relevancy score threshold of 0.7 may cause any candidate event feature associated with a relevancy score of 0.7 or greater to be appended to the candidate event feature set and candidate event features with a relevancy score of below 0.7 to be discarded. As such, only the first candidate event feature depicting a payment card with an image of a beach (e.g., associated with a relevancy of 0.8) may be appended to the candidate event feature set while the second candidate event feature depicting a payment card with an image of a rain cloud (e.g., associated with a relevancy score of 0.6) is discarded.

Additionally or alternatively, in some embodiments, the feature generation circuitry may then proceed to operation 410. As shown by operation 410, the apparatus 200 includes means, such as processor 202, memory 204, communications hardware 206, feature generation circuitry 208, candidate evaluation circuitry 212, or the like, for ordering the candidate event features based on their associated relevancy score. In some embodiments, the feature generation circuitry 208 may order the candidate event features based on their associated relevancy scores. For example, the candidate evaluation circuitry may order the candidate event features in descending order such that candidate event features associated with high relevancy scores are ordered first. By way of continuing example, the first candidate event feature depicting a payment card with an image of a beach may positioned first and the second candidate event feature depicting a payment card with an image of a rain cloud (e.g., associated with a relevancy score of 0.6) may be positioned second.

As shown by operation 412, the apparatus 200 includes means, such as processor 202, memory 204, communications hardware 206, feature generation circuitry 208, candidate evaluation circuitry 212, or the like, for appending the top N candidates to the candidate event feature set. Once the feature generation circuitry 208 has ordered the candidate event features, the feature generation circuitry 208 may select the top N candidate event features, where N is the number of candidate event features allowed in the candidate event feature set. By way of continuing example, in an instance N is 2, the feature generation circuitry may append both the first candidate event feature depicting a payment card with an image of a beach may positioned first and the second candidate event feature depicting a payment card with an image of a rain cloud to the candidate event feature set.

In some embodiments, in an instance the number of candidate event features appended to the candidate event feature set does not satisfy a required number of event features, the operations described by 402-412 may be repeated until the number of candidate event features included in the candidate event feature set satisfies the required number of event features.

Figure 5:
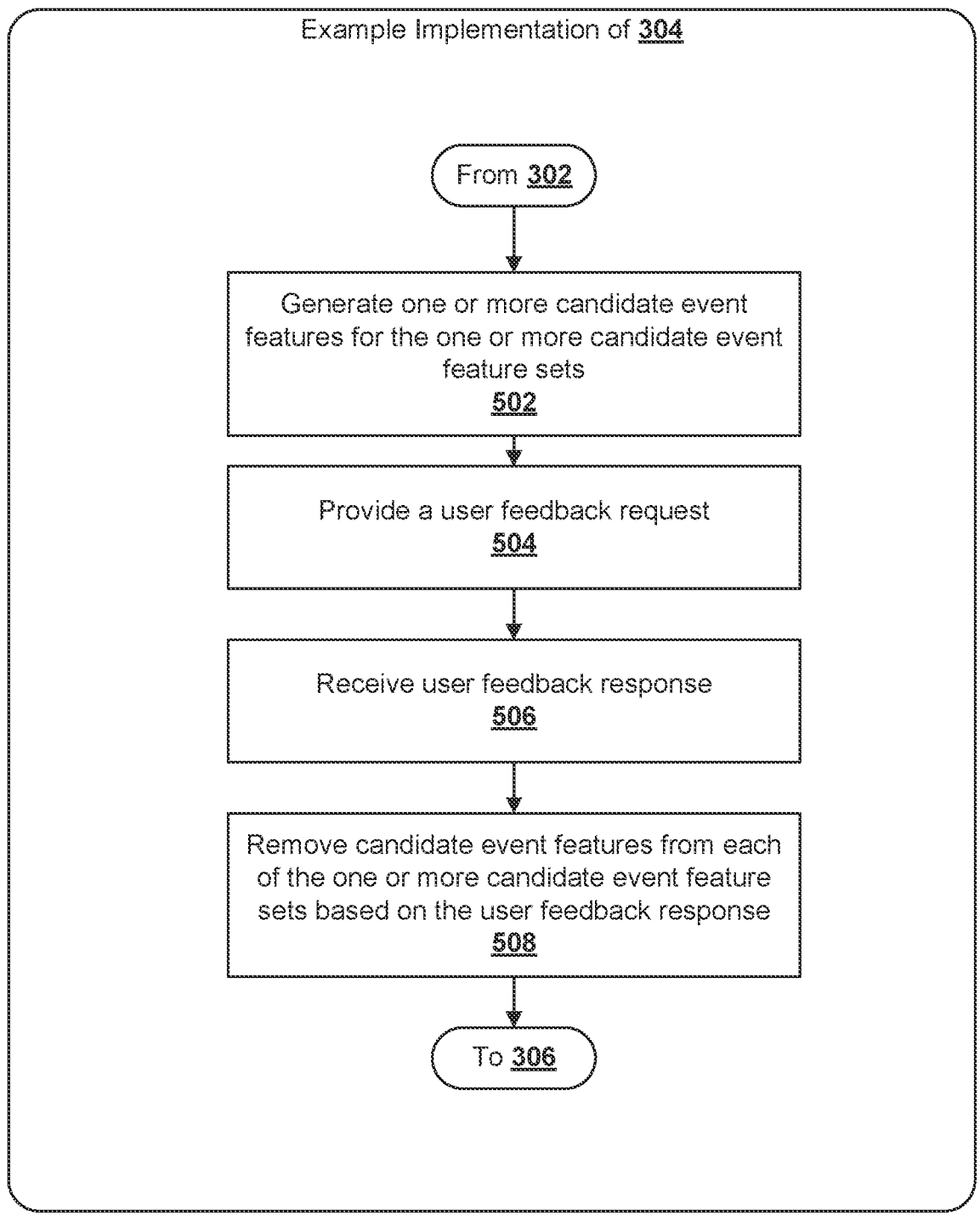
FIG. 5 illustrates an example flowchart for generating one or more candidate event feature sets based on a user feedback response, in accordance with some example embodiments described herein.

Additionally or alternatively, in some embodiments, operation 304 may be performed in accordance with the operations described by FIG. 5. Turning now to FIG. 5, example operations are shown for generating the one or more candidate event feature sets based on a user feedback response.

As shown by operation 502, the apparatus 200 includes means, such as processor 202, memory 204, communications hardware 206, feature generation circuitry 208, or the like, for generating one or more candidate event features for the one or more candidate event feature sets. The one or more candidate event features included in the one or more candidate event feature sets may be generated similarly as described above with respect to FIG. 4.

As shown by operation 504, the apparatus 200 includes means, such as processor 202, memory 204, communications hardware 206, feature generation circuitry 208, or the like, for providing a user feedback request. In some embodiments, apparatus 200 may determine to request user input for the one or more candidate event features such that a user may preview the generated candidate event features for the one or more event feature types. This may allow the user to preselect candidate event features of interest, thus resulting in more relevant generated candidate event materials. The user feedback request may further include computer executable code or instructions such that a recipient device (e.g., any one of user devices 106A-106N) may be configured to display the one or more candidate event features to the user and allow the user to select candidate event features of interested (e.g., by interacting with a device such as by swiping, clicking, or otherwise selecting displayed candidate event features).

As shown by operation 506, the apparatus 200 includes means, such as processor 202, memory 204, communications hardware 206, feature generation circuitry 208, or the like, for receiving a user feedback response. The user feedback response may describe one or more candidate event features for the one or more candidate event feature types which were selected by the user.

As shown by operation 508, the apparatus 200 includes means, such as processor 202, memory 204, communications hardware 206, feature generation circuitry 208, or the like, for removing candidate event features from each of the one or more candidate event features sets based on the user feedback response. In particular, the feature generation circuitry 208 may remove any candidate event feature which was not selected by the user as indicated by the user feedback response. As such, the feature generation circuitry 208 may remove any candidate event features which are not of interest to the user such that the computational burden for generating the candidate event materials is reduced.

In an instance the user feedback response indicates no candidate event features were selected by the user for one or more candidate event feature sets, the feature generation circuitry may repeat operations 502-508 for the candidate event feature sets which do not include candidate event features until each candidate event feature set includes at least one candidate event feature.

Returning now to FIG. 3, as shown by operation 306, the apparatus 200 includes means, such as processor 202, memory 204, communications hardware 206, event material generation circuitry 210, or the like, for generating one or more candidate event material sets. Each candidate event material set may describe a collection of candidate event materials generated in response to receipt of an event material generation request. In particular, an event material generation circuitry 210 may use an event material generation model to generate the one or more candidate event feature sets (e.g., as accessed from memory 204 or other storage device configured to store the event feature generation model). In some embodiments, the event material generation model is a machine learning model and in particular, may be a trained neural network. Alternatively, the event material generation model may be a rules-based model configured to operate according to a stored set of rules and/or operations. The event material generation model may be configured to generate a set number of candidate event materials for each event material type.

A candidate event material set may be associated with an event material type, which may correspond to an event material type included within the requested event material type set. In some embodiments, event material types may include a brochure event material type, pamphlet event material type, flyer event material type, billboard event material type, business card event material type, email event material type, giveaway box event material type, mailing campaign event material type, newspaper event material type, social media production event material type, sign event material type, window display event material type, graphical event material type, website event material type, and/or the like. In some embodiments, the number of candidate event materials generated may be a predetermined number and may be based on the event material generation request. In particular, the number of candidate event materials generated may be based on a requested number of candidate event materials described in the event material generation request.

Figure 6:
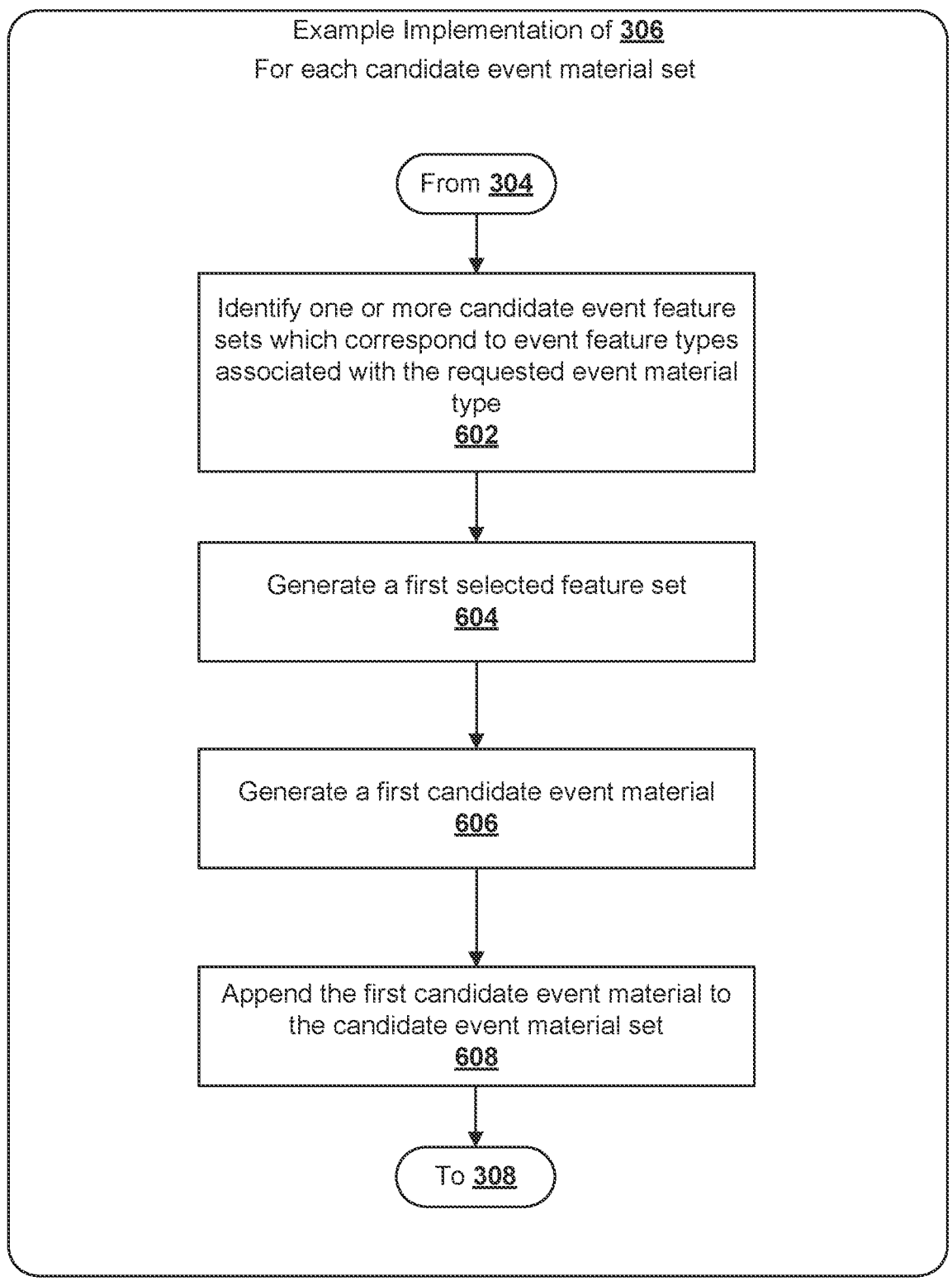
FIG. 6 illustrates an example flowchart for generating a first candidate event material, in accordance with some example embodiments described herein.
Figure 7:
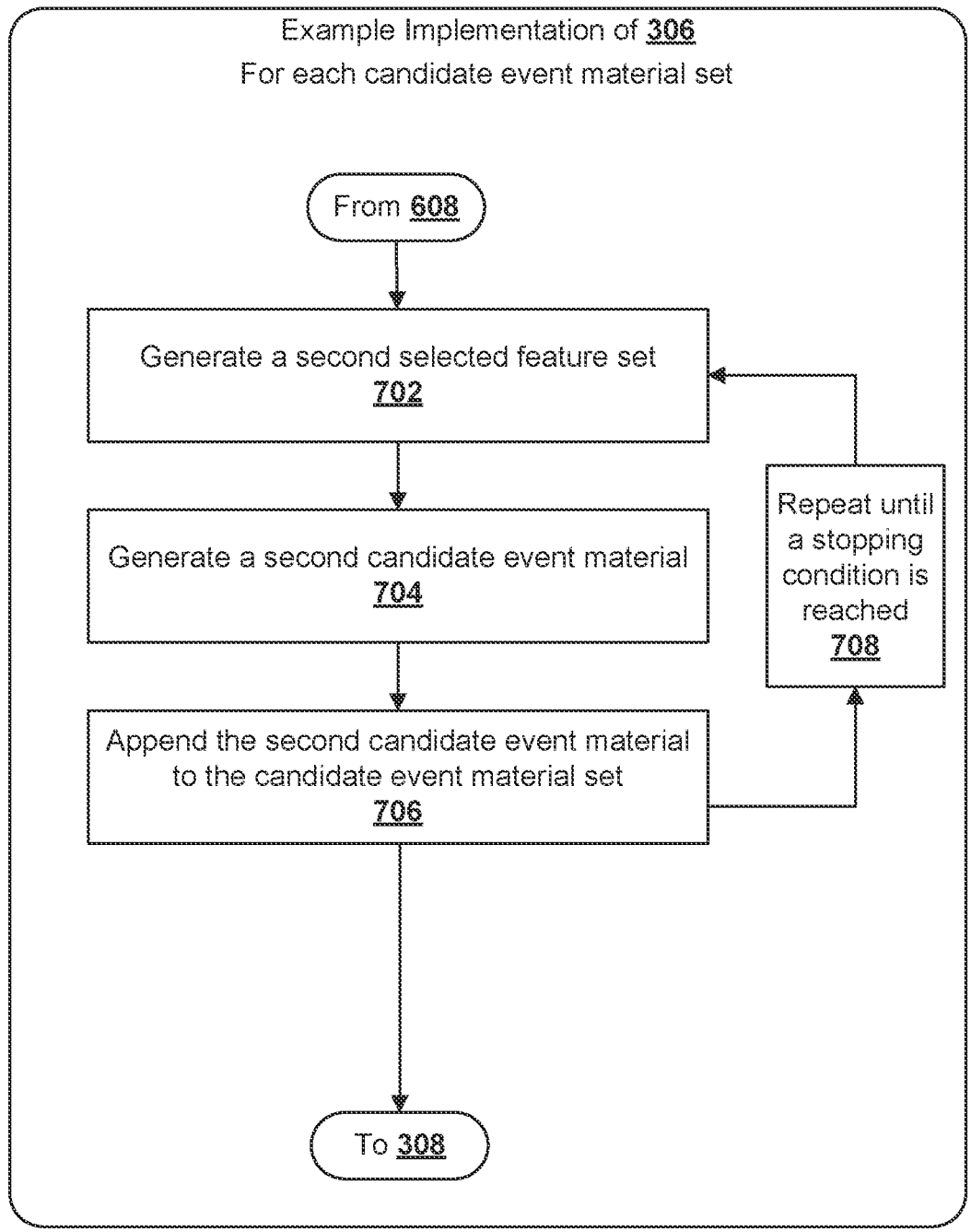
FIG. 7 illustrates an example flowchart for generating additional candidate event materials based on additional candidate event feature sets, in accordance with some example embodiments described herein.

In some embodiments, operation 306 may be performed in accordance with the operations described by FIG. 6. Turning now to FIG. 6, example operations are shown for generating a candidate event material for a candidate event material set of a particular event material type.

As shown by operation 602, the apparatus 200 includes means, such as processor 202, memory 204, communications hardware 206, event material generation circuitry 210, or the like, for identifying one or more candidate event feature sets which correspond to event feature types associated with the requested event material type set. The event material generation circuitry may use an event material generation model. The event material generation model may be configured to process the one or more candidate event feature sets and the requested event material type set to generate one or more candidate event feature sets. As described above, the requested event material type set describes one or more event material types requested by the user and each event material type may be associated with one or more candidate event feature sets. When generating candidate event materials for a given candidate event material set, the event material generated model may identify the event feature types associated with the candidate event material set and then the corresponding candidate event feature sets corresponding to the identified event feature types (e.g., as generated in operation 304). In some embodiments, the event feature types associated with an event material type may be stored in a storage location (e.g., memory 204 or another storage device) such that the event material generation model may access and use this information to identify the one or more candidate event feature sets for an event material type.

By way of continuing example, as described above, apparatus 200 may determine to generate three candidate event material sets each corresponding to an email event material type, a flyer event material type, and a brochure event material type. Feature generation circuitry may then determine that (i) an email event material type is associated with a title event feature type, a slogan event feature type, a description event feature type, and an image event feature type; (ii) a flyer event material type is associated with a title event feature type, a slogan event feature type, a description event feature type, and an image event feature type; and (iii) a brochure event material type is associated with a title event feature type, a slogan event feature type, a description event feature type, an image event feature type, and a comparative table event feature type. Thus, during operation 304, apparatus 200 may have generated five candidate event feature sets, which are associated with a title event feature type, a slogan event feature type, a description event feature type, an image event feature type, and a comparative table event feature type. As such, for a flyer event material type, the event material generation model may identify four candidate event feature sets which correspond to a title event feature type, a slogan event feature type, a description event feature type, and an image event feature type.

As shown by operation 604, the apparatus 200 includes means, such as processor 202, memory 204, communications hardware 206, event material generation circuitry 210, or the like, for generating a first selected feature set. The event material generation circuitry 210 may use the event material generation model to generate a selected feature set by selecting a candidate event feature from each of the identified candidate event feature sets (e.g., as identified in operation 602). As such, a first selected feature set may be generated and include a selected feature from each candidate event feature set.

By way of continuing example, a candidate event feature of "Introducing New Card Service ABC" may be selected from a candidate event feature set corresponding to a title event feature type, a candidate event feature of "slogan xyz" may be selected from a candidate event feature set corresponding to a slogan event feature type, a candidate event feature of "description-point 1-point 2-point 3" may be selected from a candidate event feature set corresponding to a description event feature type, and candidate event feature of a payment card with an image of a beach may be selected from a candidate event feature set corresponding to an image event feature type. As such, the first selected feature set may include, the candidate event features (i) "Introducing New Card Service ABC", (ii) "slogan xyz", (iii) "description-point 1-point 2-point 3", and (iv) a payment card with an image of a beach. Each candidate event feature included in the first selected feature set may still be associated with the corresponding event feature type such that the event material generation model may identify the candidate event feature of a corresponding event feature type.

As shown by operation 606, the apparatus 200 includes means, such as processor 202, memory 204, communications hardware 206, event material generation circuitry 210, or the like, for generating a first candidate event material. The event material generation circuitry 210 may use the event material generation model to generate the first candidate event material based on the first selected feature set. The event material generation model may generate a candidate event material based on the selected feature set and in accordance with particular specifications (e.g., event material dimensions, format, layout, etc.) associated with the event material type. In some embodiments, the specifications for a particular candidate event type may be predefined and stored in memory such that the specifications may be accessed and used by the event material generation model.

Figure 11A:
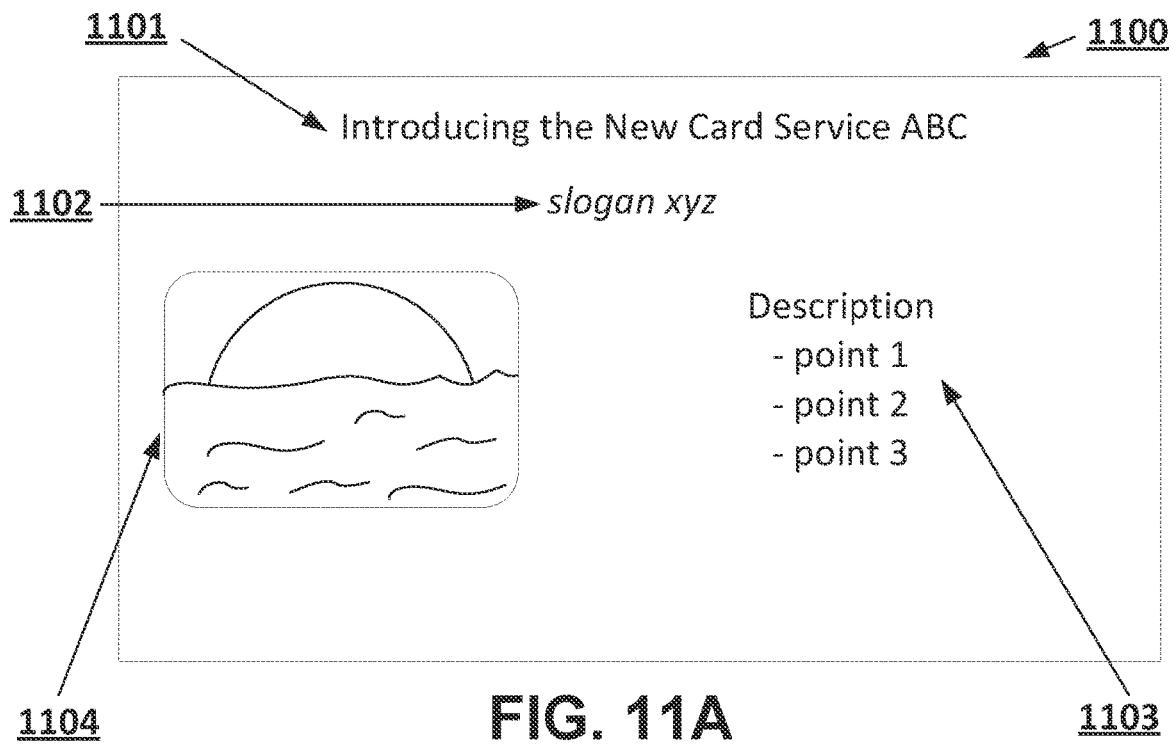
FIG. 11A illustrates a first example candidate event material, which may be generated as described herein.

FIG. 11A depicts an operational example of a candidate event material 1100 generated by the event material generation model based on a first selected feature set. In particular, candidate event material 1100 may correspond to a flyer event material type. As shown in FIG. 11A, the candidate event material 1100 includes the candidate event features 1101, 1102, 1103, and 1104, which each correspond to the candidate event features included in the first selected feature set and associated with a title event feature type, slogan event feature type, description event feature type, and image event feature type, respectively. The event material generation model may be configured to organize, format, or otherwise structure the candidate event material 1100 based on specifications associated with the flyer event material type.

As shown by operation 608, the apparatus 200 includes means, such as processor 202, memory 204, communications hardware 206, event material generation circuitry 210, or the like, for appending the first candidate event material to the candidate event material set. The event material generation circuitry may receive the first candidate event material from the event material generation model and then append the first candidate event material to the candidate event material set corresponding to the same event material type.

In some embodiments, this process may be repeated such that multiple selected feature sets are generated and used such that multiple candidate event materials are generated for a particular event material type. In particular, FIG. 7 describes generating additional candidate event materials based on additional candidate event feature sets.

As shown by operation 702, the apparatus 200 includes means, such as processor 202, memory 204, communications hardware 206, event material generation circuitry 210, or the like, for generating a second selected feature set. Similarly, to operation 604, the event material generation circuitry 210 may use the event material generation model to generate a second selected feature set by selecting a candidate event feature from each of the identified candidate event feature sets (e.g., as identified in operation 602). However, when generating additional selected feature sets, such as the second selected feature set, the event material generation model may be configured to select at least one candidate event feature of a particular event feature type that is different than the candidate event features of the same type included in the other selected feature sets (e.g., different than the first selected feature set). As such, at least one candidate event feature of an event feature type included in the second selected feature set is different than a candidate event feature corresponding to a same event feature type included in the first selected feature set.

By way of continuing example, a candidate event feature of "Introducing New Card Service ABC" may be selected from a candidate event feature set corresponding to a title event feature type, a candidate event feature of "slogan xyz" may be selected from a candidate event feature set corresponding to a slogan event feature type, a candidate event feature of "description-point 1-point 2-point 3" may be selected from a candidate event feature set corresponding to a description event feature type, and candidate event feature of a payment card with an image of a rain cloud may be selected from a candidate event feature set corresponding to an image event feature type. As such, the second selected feature set may include, the candidate event features (i) "Introducing New Card Service ABC", (ii) "slogan xyz", (iii) "description-point 1-point 2-point 3", and (iv) a payment card with an image of a rain cloud. As such, the second selected feature set include the candidate event feature of a payment card with an image of a rain cloud which corresponding to an image event feature type and is different than the candidate event feature of a payment card with an image of a beach included in the first selected feature set, which also corresponds to the image event feature type.

As shown by operation 704, the apparatus 200 includes means, such as processor 202, memory 204, communications hardware 206, event material generation circuitry 210, or the like, for generating a second candidate event material. The event material generation circuitry 210 may use the event material generation model to generate the second candidate event material based on the second selected feature set. The operation of generating the second candidate event material may be similar to the operations described in operation 606 but now uses the second selected feature set instead of the first selected feature set.

Figure 11B:
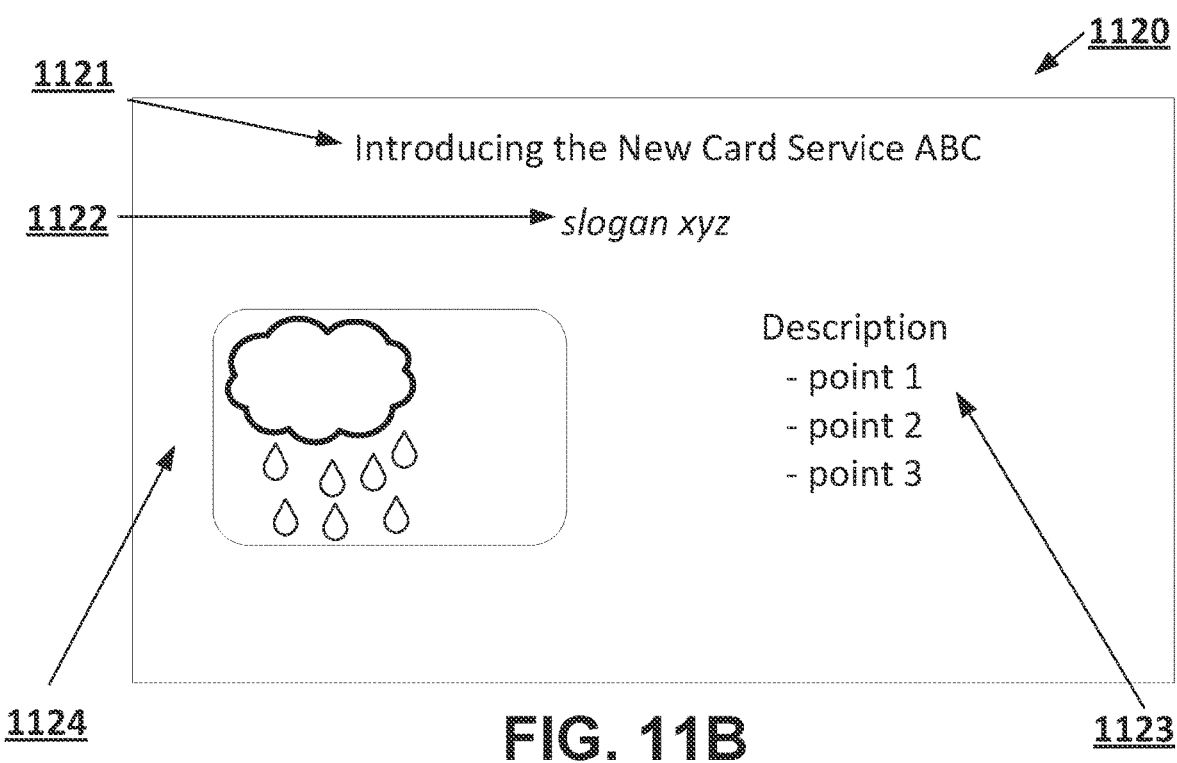
FIG. 11B illustrates a second example candidate event material which is generated based on a different selected feature set, which may be generated as described herein.

FIG. 11B depicts an operational example of a candidate event material 1120 generated by the event material generation model based on a second selected feature set. In particular, candidate event material 1120 may correspond to a flyer event material type. As shown in FIG. 11B, the candidate event material 1120 includes the candidate event features 1121, 1122, 1123, and 1124, which each correspond to the candidate event features included in the second selected feature set and associated with a title event feature type, slogan event feature type, description event feature type, and image event feature type, respectively. The event material generation model may be configured to organize, format, or otherwise structure the candidate event material 1100 based on specifications associated with the flyer event material type. As shown in FIGS. 11A and 11B, the two generated candidate event materials differ in the candidate event feature selected for the image event type, shown as 1103 in FIG. 11A and 1123 in FIG. 11B.

As shown by operation 706, the apparatus 200 includes means, such as processor 202, memory 204, communications hardware 206, event material generation circuitry 210, or the like, for appending the second candidate event material to the candidate event material set. The event material generation circuitry may receive the second candidate event material from the event material generation model and then append the second candidate event material to the candidate event material set corresponding to the same event material type.

As shown by operation 708, the apparatus 200 includes means, such as processor 202, memory 204, communications hardware 206, event material generation circuitry 210, or the like, for repeating the operations 702-706 until a stopping condition is reached. In particular, the event material generation circuitry 210 may use the event material generation model to generate any number of candidate event materials, each corresponding to a different selected feature set. As described above, each selected feature set is unique such that combination of candidate event features is unique between the selected feature sets. As such, the generated candidate event features include different content due to the different candidate event features included in the selected feature set.

In some embodiments, a stopping condition may be defined based on the number of requested candidate event materials for a given candidate event type. For example, in an instance ten flyer candidate event materials are requested, operations 702-706 may repeat until ten candidate event materials are appended to the candidate event material set corresponding to the flyer event material type. In some embodiments, a stopping condition may be a set amount of time. For example, a stopping condition may be 1 minute such operations 702-706 may be repeated until a time period of one minute has passed.

Figure 8:
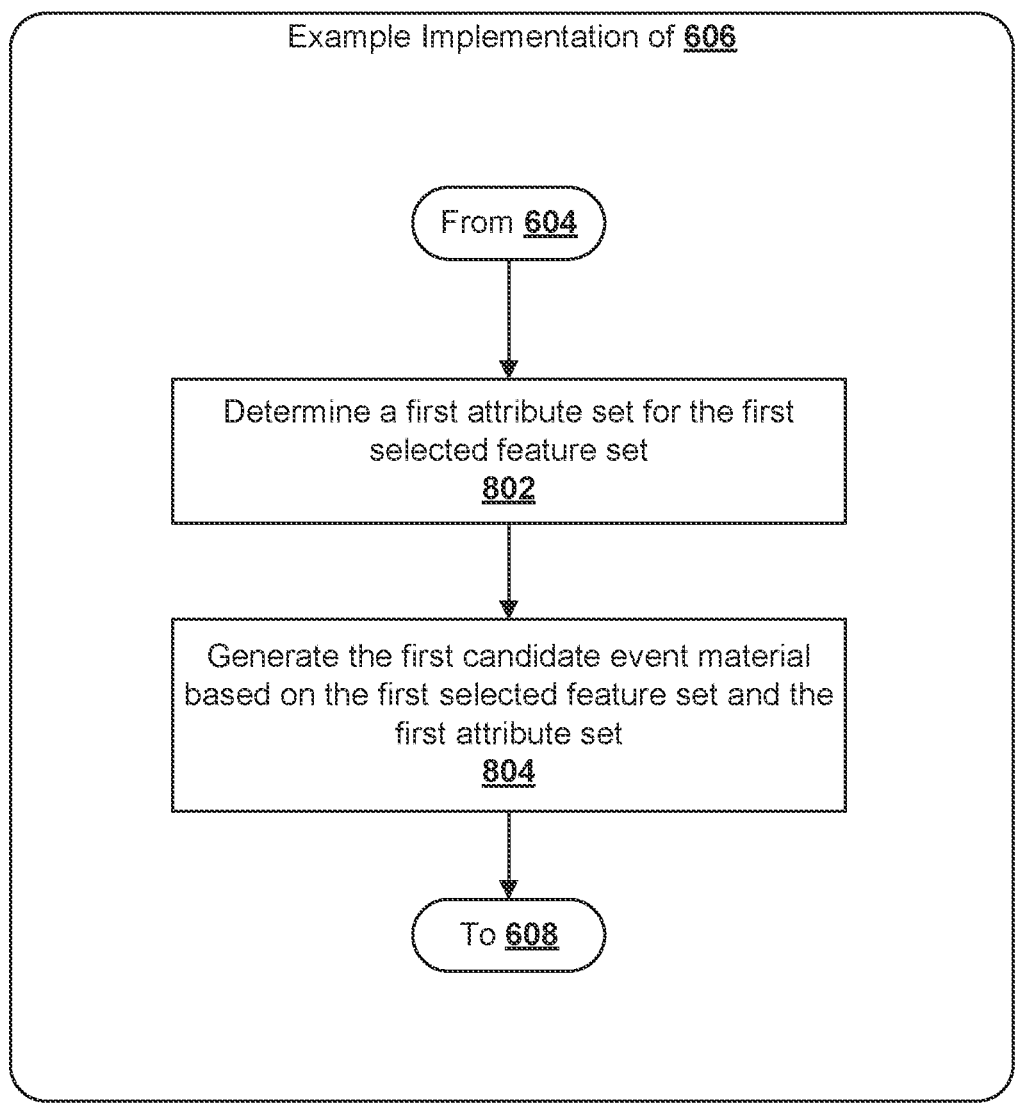
FIG. 8 illustrates an example flowchart for generating a first candidate event material based on a first attribute set, in accordance with some example embodiments described herein.

In some embodiments, operation 606 may be performed in accordance with the operations described by FIG. 8. Turning now to FIG. 8, example operations are shown for generating a candidate event feature set based on a first attribute set.

As shown by operation 802, the apparatus 200 includes means, such as processor 202, memory 204, communications hardware 206, event material generation circuitry 210, or the like, for determining a first attribute set for the first selected feature set. Each selected feature set may additionally be associated with an attribute set that includes one or more attributes. An attribute set may be generated based on the associated requested characteristic set or may be determined based on default attributes. An attribute in a given attribute set may describe a particular format, specification, shape, size, style, and/or the like for the one or more selected candidate event features. In some embodiments, an attribute may describe a font selection, text size, color, relative position, or absolute position for selected candidate event features. As such, the selected features included in the selected feature set for the candidate event material may be incorporated into the candidate event material based on the attributes in the attribute set.

In particular, the event material generation circuitry 210 may use the event material generation model to generate one or more attribute sets. In some embodiments, the event material generation model may use NLP techniques and/or sentiment analysis techniques to process the requested characteristics set and determine one or more attributes based on the requested characteristics. In some embodiments, the event material generation model may be a classification neural network that may be trained to determine one or more attribute categories based on the requested characteristics set. Each attribute category may be associated with various identifiable sentiments, keywords, target audiences or demographics, and/or the like. As such, the event material generation model may process the requested characteristics set to identify sentiments, keywords, target audiences or demographics, etc. and determine or more attribute categories to use when generating the candidate event material set. Each attribute category may be associated with one or more attributes, which the event material generation model may identify and append to an attribute set for a given selected feature set. In some embodiments, an attribute category may include multiple attribute options for a same attribute type such that all options are included in the attribute set.

By way of continuing example, the event material generation model may process the requested characteristics set which includes the design elements "bright", "professional", and a graphical image of a beach with clouds, a target demographic of "young adults", and keywords "new card service". A first generated attribute set may include a font selection of "calibri" for each applicable candidate event feature. and a font size of "16" for each applicable candidate event feature.

As shown by operation 804, the apparatus 200 includes means, such as processor 202, memory 204, communications hardware 206, event material generation circuitry 210, or the like, for generating the first candidate event material based on the first selected feature set and the first attribute set. As such, the attributes, characteristics, or other elements described by the first set of attributes is incorporated by the first candidate event material. For example, referring back to FIG. 11A, the font selection for each of candidate event features 1101-1103 may be "calibri" and the font size may be "16".

In some embodiments, this process may be repeated such that multiple attribute sets are generated and used such that multiple candidate event materials are generated for a particular selected feature set. In particular, FIG. 9 describes generating additional candidate event materials based on additional attribute sets.

As shown by operation 902, the apparatus 200 includes means, such as processor 202, memory 204, communications hardware 206, event material generation circuitry 210, or the like, for determining a second attribute set for the first selected feature set. The second attribute set may be generated similarly as to the first attribute set described above with respect to operation 802. However, when generating additional attribute sets, such as the second attribute set, the event material generation model may be configured to determine at least one attribute of a particular attribute type that is different than the attributes of the same attribute type included in the other attribute sets (e.g., different than the first attribute set). As such, at least one attribute of an attribute type included in the second attribute set is different than an attribute corresponding to a same attribute type included in the first attribute set.

By way of continuing example, the event material generation model may process the requested characteristics set which includes the design elements "bright", "professional", and a graphical image of a beach with clouds, a target demographic of "young adults", and keywords "new card service". A second generated attribute set may include a font selection of "curlz MT" for each applicable candidate event feature. and a font size of "16" for each applicable candidate event feature. The font selection "curlz MT" may be selection to appear more youthful due to the "young adult" demographic in contrast to the "calibri" font selection in the first attribute set, which may appear more professional due to the "professional" design element.

As shown by operation 904, the apparatus 200 includes means, such as processor 202, memory 204, communications hardware 206, event material generation circuitry 210, or the like, for generating an additional candidate event material based on the first selected feature set and the second attribute set. As such, the attributes, characteristics, or other elements described by the second set of attributes is incorporated by the first candidate event material.

Figure 11C:
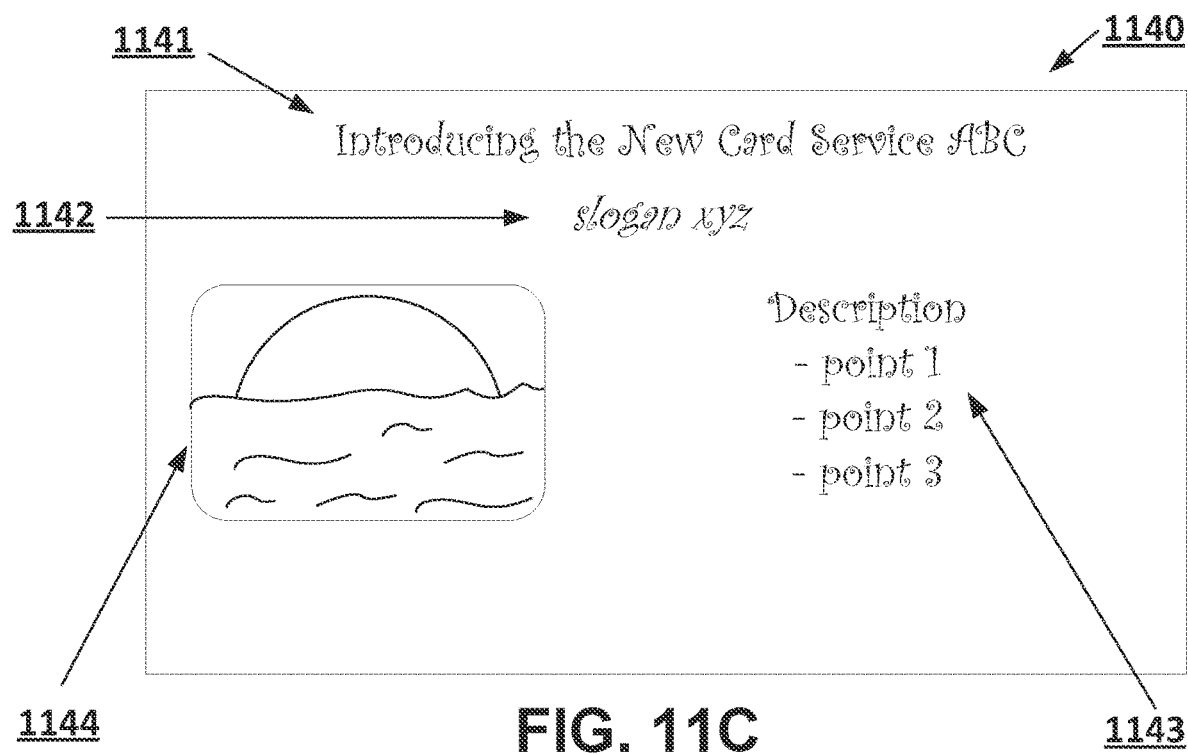
FIG. 11C illustrates a third example candidate event material which is generated based on a different attribute set, which may be generated as described herein.

FIG. 11C depicts an operational example of a candidate event material 1140 generated by the event material generation model based on the first selected feature set (e.g., the same as candidate event material 1100 depicted in FIG. 11A) and the second attribute set. In particular, candidate event material 1140 may correspond to a flyer event material type and therefore includes candidate event features 1141, 1142, 1143, and 1144, which each correspond to the candidate event features included in the first selected feature set and associated with a title event feature type, slogan event feature type, description event feature type, and image event feature type, respectively. Here, the event material generation model may be configured to organize, format, or otherwise structure the candidate event material 1140 based on second attribute set. As shown in FIGS. 11A and 11C, the two generated candidate event materials differ in the font selection, where the candidate event material 1100 uses a "calibri" font selection and the candidate event material 1140 uses a "curlz MT" font selection.

As shown by operation 906, the apparatus 200 includes means, such as processor 202, memory 204, communications hardware 206, event material generation circuitry 210, or the like, for appending the additional candidate event material to the candidate event material set. The event material generation circuitry may receive the additional candidate event material from the event material generation model and then append the additional candidate event material to the candidate event material set corresponding to the same event material type.

As shown by operation 908, the apparatus 200 includes means, such as processor 202, memory 204, communications hardware 206, event material generation circuitry 210, or the like, for repeating the operations 902-906 until a stopping condition is reached. In particular, the event material generation circuitry 210 may use the event material generation model to generate any number of attribute sets. As described above, each attribute set is unique such that combination of attributes is unique between the attribute sets. As such, the generated candidate event features may also be depicted in different renderings or styles due to the different attributes included in the attribute set.

In some embodiments, a stopping condition may be defined based on the number of requested candidate event materials for a given candidate event type or selected feature set. For example, in an instance five different representations of a flyer candidate event material for a first selected feature set may be requested (e.g., such as in the event material generation request), operations 902-906 may repeat until five candidate event materials are appended to the candidate event material set corresponding to the flyer event material type and using the first selected feature set. In some embodiments, a stopping condition may be a set amount of time. For example, a stopping condition may be 1 minute such operations 902-906 may be repeated until a time period of one minute has passed.

Figure 9:
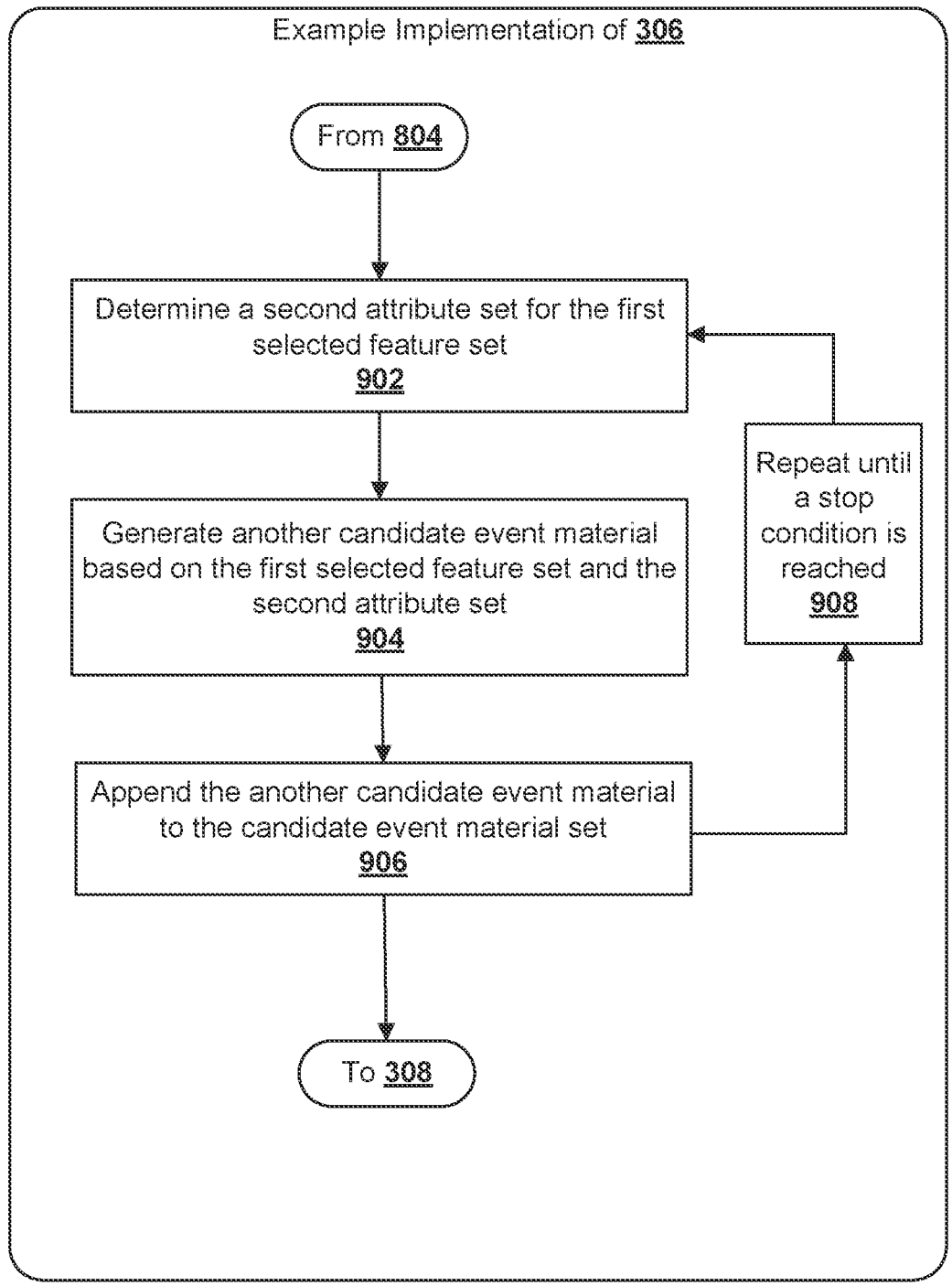
FIG. 9 illustrates an example flowchart for generating additional candidate event materials based on additional attribute sets, in accordance with some example embodiments described herein.

The operations depicted and described with respect to FIGS. 8 and 9 may be repeated for each selected feature set that is generated.

Returning now to FIG. 3, as shown by operation 308, the apparatus 200 includes means, such as processor 202, memory 204, communications hardware 206, or the like, for providing the one or more candidate event material sets. The one or more candidate event material sets may be provided to one or more user devices, such as any one of user devices 106A-106N. As such, one or more end users may be provided with the generated candidate event materials for the requested event material types. Each event material type may be associated with a particular file type or file extensions such that it may be provided in the associated file type or format. In some embodiments, users may interact with the candidate event material sets such that they may choose or select the candidate event materials of interest from one or more candidate event material sets and download the select candidate event materials.

Figure 12:
FIG. 12 depicts an operational example of an example user interface used in some example embodiments described herein.
Figure 12:
Figure 12:
Figure 12:
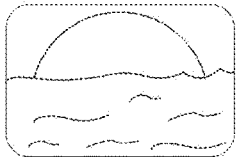
Figure 12:
Figure 12:
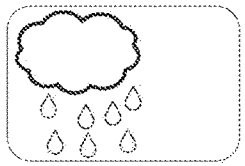
Figure 12:
Figure 12:
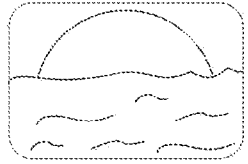
Figure 12:

FIG. 12 depicts an operational example of an example user interface which may be rendered in response to provision of the one or more candidate event material sets. As noted previously, a user may interact with the candidate event material generation system 102 by directly engaging with communications hardware 206 of an apparatus 200 comprising a system device of the candidate event material generation system 102. In such an embodiment, the interface shown in FIG. 12 may be displayed to a user by the apparatus 200. Alternatively, a user may interact with the candidate event material generation system 102 using a separate user device (e.g., any of user device 106A-106N, as shown in FIG. 1), which may communicate with the candidate event material generation system 102 via communications network 104. In such an embodiment, the GUI shown in FIG. 8 may be displayed to the user by a corresponding user device. By way of continuing example, the user may be provided with an email candidate event material set, a flyer candidate event material set, and a brochure candidate event material set. The user may interact with the candidate event materials using a selection tool 1205 to indicate interest in outputting these candidate event materials in a particular format. The user may interact with a download tool 1210, which may cause the selected candidate event materials to be downloaded to a particular storage of memory as selected by the user in the file type or extension associated with the event material type. For example, the user may select option 1 from the flyer event material type using selection tool 1205 and then interact with the download tool 1210 to download the candidate event material corresponding to option 1 in a particular format (e.g., a pdf format).

FIGS. 3-9 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Interaction

Figure 10:
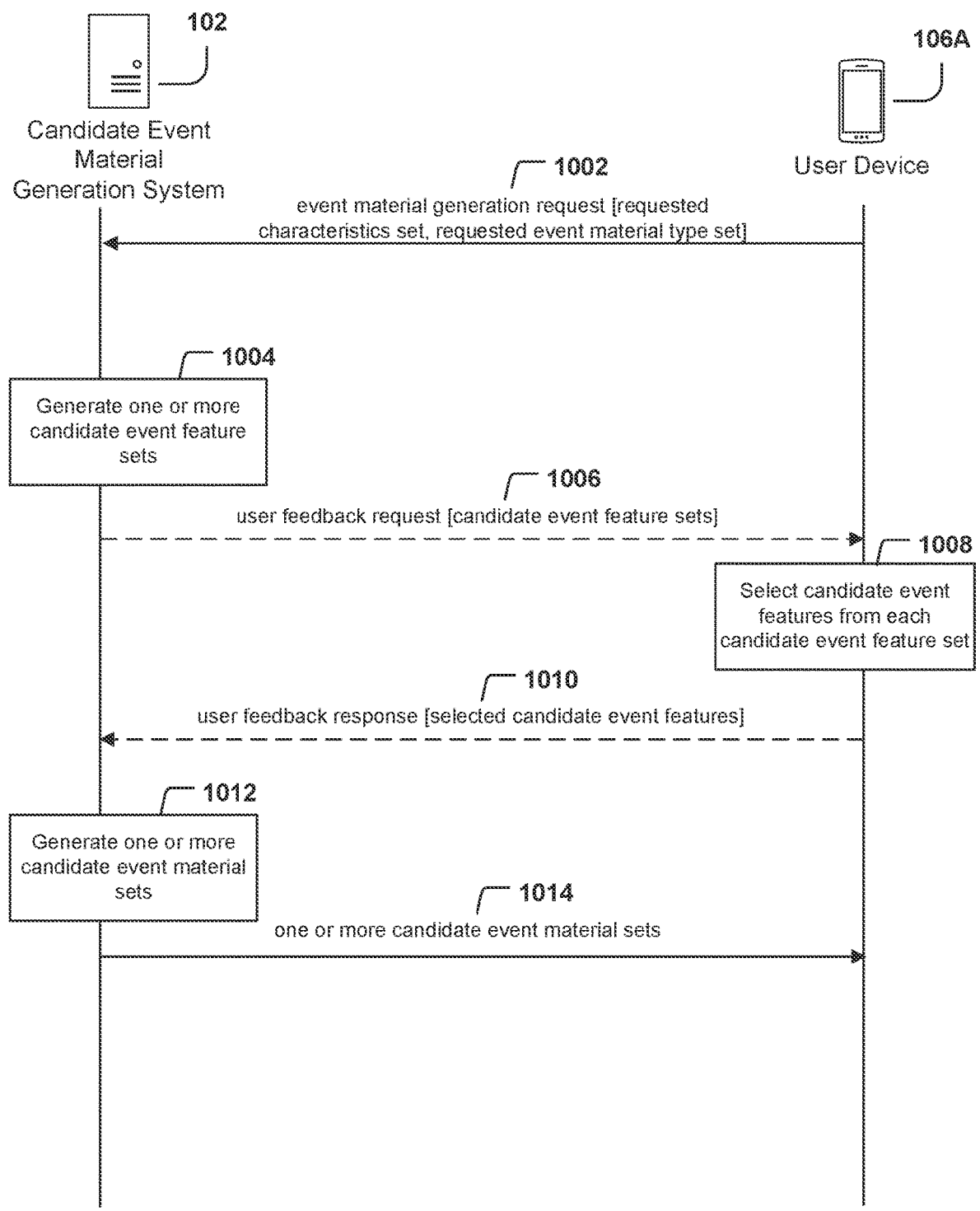
FIG. 10 illustrates a swim lane diagram with example operations that may be performed by components of the environment depicted in FIG. 1, in accordance with some example embodiments described herein.

FIG. 10 shows a swim lane diagram illustrating example operations (e.g., as described above in connection with FIGS. 3-9) performed by components of the environment depicted in FIG. 1 to produce various benefits of the implementations described herein. The operations shown in the swim lane diagram performed by a candidate event material generation system 102, such as by an associated system device, are shown along the line extending from the box labeled "candidate event material generation system 102" and operations performed by a user device, such as any one of user devices 106A-106N, are shown along the line extending from the box labeled "user device 106A." Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 10.

At operation 1002, user device 106A may provide the candidate event material generation system 102 with an event material generation request that includes a requested characteristics set and a requested event material type set. At operation 1004, candidate event material generation system 102 may generate one or more candidate event feature sets. Optionally, at operation 1006, the candidate event material generation system 102 may provide a user feedback request which includes one or more candidate event feature sets. At operation 1008, the user device 106A may select candidate event features from each candidate event feature set based on user interaction and/or selection. At operation 1010, candidate event material generation system 102 may receive a user feedback response from the user device 106A which includes selected candidate event features for each candidate event feature set included in the user feedback request. At operation 1012, the candidate event material generation system 102 may generate one or more candidate event material sets. At operation 1014, the candidate event material generation system 102 may provide the one or more candidate event material sets to the user device 106A.

In some embodiments, some of the operations described above in connection with FIGS. 3-9 may be modified or further amplified. Furthermore, in some embodiments, additional optional operations may be included. Modifications, amplifications, or additions to the operations above may be performed in any order and in any combination.

CONCLUSION

As described above, example embodiments provide methods and apparatuses that enable improved candidate event material generation. By avoiding the need to manually generate event materials, example embodiments thus save time and resources, providing a wide variety of options, and also automatically generating relevant candidate event materials that has traditionally not been possible. Moreover, by automating candidate event material generation that has historically been performed manually by one or more parties, the speed at which the candidate event materials are generated, and the quality of the candidate event materials unlocks many potential new functions that have historically not been available, such as the ability to generate a large volume of candidate event materials in near-real-time.

As these examples all illustrate, example embodiments contemplated herein provide technical solutions that solve real-world problems faced during event material generation. In particular, the above described embodiments allow for the generation of candidate event features in a manner that is sentiment-aware and/or context-aware such that candidate event materials are relevant to the characteristics specified by the user. Additionally, embodiments described herein may allow for the simultaneous generation of candidate event materials that vary in content as well as style such that an end user may be presented with a variety of candidate event feature combination and styles for a variety of candidate event materials.

In some embodiments, a candidate event material generation system may further increase speed and operational reliability of an electronic data management system that is configured to generate the candidate event materials by performing parallel processing operations. For example, the operations of generating candidate event features for each candidate feature set, generating attributes for each attribute set, and/or generating candidate event materials for each candidate event material set may be performed simultaneously. As such, the candidate event materials for requested candidate event material types may be provided to a user in a more computationally and resource efficient manner.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating one or more candidate event material sets, the method comprising:
   receiving, by communications hardware, an event material generation request, wherein the event material generation request comprises a requested characteristics set and a requested event material type set;
   generating, via feature generation circuitry and using an event feature generation model, one or more candidate event feature sets, wherein each candidate event feature set is associated with an event feature type that is associated with the requested event material type set and based on the requested characteristics set;
   generating, via event material generation circuitry and using an event material generation model, the one or more candidate event material sets based on the one or more candidate event feature sets, wherein each candidate event material set is associated with an event material type included in the requested event material type set; and
   providing, by the communications hardware, the one or more candidate event material sets.

2. The method of claim 1, wherein generating the one or more candidate event material sets further comprises:
   for each candidate event material set:
      identifying, via the event material generation circuitry, one or more of the one or more candidate event feature sets which correspond to one or more event feature types associated with an event material type for the candidate event material set;
      generating, via the event material generation circuitry and using the event material generation model, a first selected feature set by selecting a candidate event feature from each of the identified candidate event feature sets;
      generating, via the event material generation circuitry and using the event material generation model, a first candidate event material corresponding to the event material type based on the first selected feature set; and appending, via the event material generation circuitry, the first candidate event material to a candidate event material set.

3. The method of claim 2, further comprising:
for each candidate event material set:
generating, via the event material generation circuitry and using the event material generation model, a second selected feature set by selecting a candidate event feature from each of the identified candidate event feature sets, wherein at least one candidate event feature corresponding to an event feature type included in the second selected feature set is different than a candidate event feature corresponding to a same event feature type included in the first selected feature set;
generating, via the event material generation circuitry and using the event material generation model, a second candidate event material corresponding to the event material type based on the second selected feature set; and
appending, via the event material generation circuitry, the second candidate event material to a candidate event material set.

4. The method of claim 2, wherein generating the first candidate event material further comprises:
determining, via the event material generation circuitry and using the event material generation model, a first attribute set for the first selected feature set based on the requested characteristics set, wherein generating the first candidate event material is based on the first selected feature set and the first attribute set.

5. The method of claim 4, wherein attributes included in the first attribute set comprise one or more of a font selection, text size, color, relative position, or absolute position for candidate event features included in the first selected feature set.

6. The method of claim 4, further comprising:
determining, via the event material generation circuitry and using the event material generation model, a second attribute set for the first selected feature set based on the requested characteristics set, wherein at least one attribute included in the second attribute set is different than an attribute included in the first attribute set;
generating, via the event material generation circuitry and using the event material generation model, an additional candidate event material corresponding to the requested event material type based on the first selected feature set and the second attribute set; and
appending, via the event material generation circuitry, the additional candidate event material to the candidate event material set.

7. The method of claim 1, wherein (i) the event material generation request further comprises one or more predetermined event feature sets and (ii) each predetermined event feature set is associated with an event feature type, and
wherein generating the one or more candidate event feature sets further comprises:
for each event feature type associated with a predetermined event feature set, generating, via the feature generation circuitry, a candidate event feature set for the event feature type which includes the predetermined event features described by a corresponding predetermined event feature set.

8. The method of claim 1, further comprising:
for each candidate event feature set:
generating, via the feature generation circuitry and using the event feature generation model, one or more candidate event features; and
determining, via candidate evaluation circuitry and using an evaluation model, a relevancy score for each candidate event feature based on a comparison between the requested characteristics set and the candidate event feature.

9. The method of claim 8, wherein generating the one or more candidate event feature sets further comprises:
for each candidate event feature set:
selecting, via the feature generation circuitry and using the event feature generation model, one or more candidate event features based on an associated relevancy score; and
appending, via the feature generation circuitry and using the event feature generation model, the one or more selected candidate event features to a corresponding selected feature set.

10. The method of claim 1, further comprising:
providing, by the communications hardware, a user feedback request, wherein the user feedback request comprises one or more of the one or more candidate event feature sets; and
receiving, by the communications hardware, a user feedback response, wherein the user feedback response comprises one or more selections of candidate event features from each of the one or more candidate event feature sets provided in the user feedback request.

11. The method of claim 10, further comprising:
removing, via the feature generation circuitry, candidate event features which were not selected from each of the one or more candidate event feature sets.

12. An apparatus for generating one or more candidate event material sets, the apparatus comprising:
communications hardware configured to receive an event material generation request, wherein the event material generation request comprises a requested characteristics set and a requested event material type set;
feature generation circuitry configured to generate, using an event feature generation model, one or more candidate event feature sets, wherein each candidate event feature set is associated with an event feature type that is associated with the requested event material type set and based on the requested characteristics set; and
event material generation circuitry configured to generate, using an event material generation model, the one or more candidate event material sets based on the one or more candidate event feature sets, wherein each candidate event material set is associated with an event material type included in the requested event material type set, and
wherein the communications hardware is further configured to provide the one or more candidate event material sets.

13. The apparatus of claim 12, wherein the event material generation circuitry is further configured to:
for each candidate event material set:
identify one or more of the one or more candidate event feature sets which correspond to one or more event feature types associated with an event material type for the candidate event material set;
generate, using the event material generation model, a first selected feature set by selecting a candidate event feature from each of the identified candidate event feature sets;

generate, using the event material generation model, a first candidate event material corresponding to the event material type based on the first selected feature set; and append the first candidate event material to a candidate event material set.

14. The apparatus of claim 13, wherein the event material generation circuitry is further configured to:

for each candidate event material set:

generate, using the event material generation model, a second selected feature set by selecting a candidate event feature from each of the identified candidate event feature sets, wherein at least one candidate event feature corresponding to an event feature type included in the second selected feature set is different than a candidate event feature corresponding to a same event feature type included in the first selected feature set;

generate, using the event material generation model, a second candidate event material corresponding to the event material type based on the second selected feature set; and append the second candidate event material to a candidate event material set.

15. The apparatus of claim 13, wherein the event material generation circuitry is further configured to:

determine, using the event material generation model, a first attribute set for the first selected feature set based on the requested characteristics set, wherein generating the first candidate event material is based on the first selected feature set and the first attribute set.

16. The apparatus of claim 15, wherein the event material generation circuitry is further configured to:

determine, using the event material generation model, a second attribute set for the first selected feature set based on the requested characteristics set, wherein at least one attribute included in the second attribute set is different than an attribute included in the first attribute set;

generate, using the event material generation model, an additional candidate event material corresponding to the requested event material type based on the first selected feature set and the second attribute set; and append the additional candidate event material to the candidate event material set.

17. The apparatus of claim 12, wherein (i) the event material generation request further comprises one or more predetermined event feature sets and (ii) each predetermined event feature set is associated with an event feature type, and wherein the feature generation circuitry is further configured to:

for each event feature type associated with a predetermined event feature set, generate a candidate event feature set for the event feature type which includes the predetermined event features described by a corresponding predetermined event feature set.

18. The apparatus of claim 12, wherein the feature generation circuitry is further configured to generate, using the event feature generation model, one or more candidate event features, and wherein the apparatus further comprises candidate evaluation circuitry configured to determine, using an evaluation model, a relevancy score for each candidate event feature based on a comparison between the requested characteristics set and the candidate event feature.

19. The apparatus of claim 18, wherein the feature generation circuitry is further configured to:

for each candidate event feature set:

select, using the event feature generation model, one or more candidate event features based on an associated relevancy score; and append, using the event feature generation model, the one or more selected candidate event features to a corresponding selected feature set.

20. A computer program product for generating one or more candidate event material sets, the computer program product comprising at least one non-transitory computer-readable storage medium storing software instructions that, when executed, cause an apparatus to:

receive an event material generation request, wherein the event material generation request comprises a requested characteristics set and a requested event material type set;

generate, using an event feature generation model, one or more candidate event feature sets, wherein each candidate event feature set is associated with an event feature type that is associated with the requested event material type set and based on the requested characteristics set;

generate, using an event material generation model, the one or more candidate event material sets based on the one or more candidate event feature sets, wherein each candidate event material set is associated with an event material type included in the requested event material type set; and provide the one or more candidate event material sets.

* * * * *